United States Patent
Mooney et al.

(10) Patent No.: US 7,660,088 B2
(45) Date of Patent: Feb. 9, 2010

(54) SYSTEM, APPARATUS AND METHOD FOR COMPENSATING THE SENSITIVITY OF A SEQUENCE ELEMENT IN A LINE CURRENT DIFFERENTIAL RELAY IN A POWER SYSTEM

(75) Inventors: Joseph B. Mooney, Colfax, WA (US); Gabriel Benmouyal, Boucherville (CA)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 608 days.

(21) Appl. No.: 11/337,894

(22) Filed: Jan. 23, 2006

(65) Prior Publication Data
US 2007/0070565 A1 Mar. 29, 2007

Related U.S. Application Data

(60) Provisional application No. 60/715,272, filed on Sep. 7, 2005.

(51) Int. Cl.
*H02H 3/00* (2006.01)
*H02H 7/00* (2006.01)

(52) U.S. Cl. .............................. 361/63; 361/64; 361/65; 361/66

(58) Field of Classification Search ............... 361/63–66
See application file for complete search history.

(56) References Cited

U.S. PATENT DOCUMENTS
4,351,011 A * 9/1982 Liberman .................... 361/82
(Continued)

FOREIGN PATENT DOCUMENTS
EP 1087294 A2 3/2001

OTHER PUBLICATIONS

Jeff Roberts, Tony Lee, and George Alexander; Schweitzer Engineering Laboratories, Inc.; Security And Dependability Of Multiterminal Transmission Line Protection; 28th Annual Western Protective Relay Conference. Spokane, Washington, Oct. 23-25, 2001.

(Continued)

*Primary Examiner*—Stephen W Jackson
*Assistant Examiner*—Scott Bauer
(74) *Attorney, Agent, or Firm*—Law Offices of Eugene M. Cummings, P.C.

(57) ABSTRACT

An apparatus and method compensate for the sensitivity of at least one line current differential element of a first current differential relay providing differential protection for a transmission line of a power system during a single-phase pole-open condition. The apparatus includes a first delta filter configured to remove a first pre-fault current from a first fault current of the transmission line to derive a compensated first current phasor. The apparatus also includes a second delta filter configured to remove a second pre-fault current from a second fault current of the transmission line to derive a compensated second current phasor. The compensated first and second current phasors are provided to the at least one line current differential element to compensate the sensitivity of the at least one line current differential element.

52 Claims, 10 Drawing Sheets

U.S. PATENT DOCUMENTS

| | | | |
|---|---|---|---|
| 4,731,689 A * | 3/1988 | Nimmersjo et al. | 361/66 |
| 6,417,791 B1 | 7/2002 | Benmouyal et al. | |
| 6,518,767 B1 | 2/2003 | Roberts et al. | |
| 6,525,543 B1 | 2/2003 | Roberts et al. | |
| 6,590,397 B2 | 7/2003 | Roberts | |
| 6,813,571 B2 | 11/2004 | Lightbody | |
| 2003/0117025 A1 | 6/2003 | Rouquette | |
| 2005/0030693 A1 | 2/2005 | Deak | |
| 2006/0218310 A1 | 9/2006 | Morris | |
| 2007/0070565 A1 | 3/2007 | Benmouyal | |

OTHER PUBLICATIONS

Leonard Ernst, Walter Hinnman, David Quam, James Sharp, Dowty Control Technologies, Cornell University; Charge Comparison Protection Of Transmission Lines-Relaying Concepts; IEEE Transactions on Power Delivery, vol. 7, No. 4, Oct. 1992.

Gabriel Benmouyal, Schweitzer Engineering Laboratories, Inc.; The Trajectories Of Line Current Differential Faults in The Alpha Panel; SEL 2005.

Gabriel Benmouyal and Tony Lee, Schweitzer Engineering Laboratories, Inc.; Securing Sequence-Current Differential Elements; SEL 2004; http://www.selinc.com/techpprs/6173_SecuringSequence_20040928.pdf.

Debra Carroll and John Dorfner, Tacoma Power; Tony Lee and Ken Fodero, Schweitzer Engineering Laboratories, Inc.; Chris Huntley, GE Lentronics; Resolving Digital Line Current Differential Relay Security And Dependability Problems: A Case History; 29th Annual Protective Relay Conference, Spokane, Washington, Oct. 22-24, 2002; http://www.selinc.com/techpprs/6140.pdf.

Ken Fodero, Schweitzer Engineering Laboratories, Inc.; Girolamo Rosselli, San Diego Gas & Electric; Applying Digital Current Differential Systems Over Leased Digital Service; SEL 2004; http://www.selinc.com/techpprs/SEL_Fodero_Rosselli_ApplyingDigitalCurrent_6186.pdf.

Fernando Calero, Schweitzer Engineering Laboratories, Inc.; Rebirth Of Negative-Sequence Quantities in Protective Relaying With Microprocessor-Based Relays; SEL 2003 http://www.selinc.com/techpprs/6155.pdf.

Stanley E. Zocholl, Schweitzer Engineering Laboratories, Inc.; Rating CTS For Low Impedance Bus And Machine Differential Applications; SEL 2000, 2002, 2003; http://www.selinc.com/techpprs/6107.pdf.

Fernando Calero and Daqing Hou, Schweitzer Engineering Laboratories, Inc.; Practical Considerations For Single-Pole-Trip Line-Protection Schemes; SEL 2004; http://www.selinc.com/techpprs/SEL_Calero_Hou_PractConsiderations_6184.pdf.

Jeff Roberts, Demetrios Tziouvaras, Gabriel Benmouyal, Hector J. Altuve, Schweitzer Engineering Laboratories, Inc., The Effect Of Multiprinciple Line Protection On Dependability And Security; SEL 2000, 2001, http://www.selinc.com/techpprs/6109-Paper-WPRC.pdf.

Gabriel Benmouyal and Stanley E. Zocholl, Schweitzer Engineering Laboratories, Inc., The Impact Of High Fault Current And CT Rating Limits On Overcurrent Protection; SEL 2002; http://www.selinc.com/techpprs/6142.pdf.

S.E. Zocholl, Schweitzer Engineering Laboratories, Inc., D.W. Smaha, Southern Company Services, Inc., Current Transformer Concepts; SEL 1992; http://www.selinc.com/techpprs/6038.pdf.

Dragan Ristanovic; New Methodology For Transmission Line Relay Testing And Evaluation Using Advanced Tools; Submitted to the Office of Graduate Studies of Texas A&M University in partial fulfillment of the requirements for the degree of Master of Science; Dec. 2003.

PCT/US2006/035175, Patent Cooperation Treaty, From the International Bureau, PCT Notification Concerning Transmittal of Copy of International Preliminary Report on Patentability (Chapter 1 of the Patent Cooperation Treaty), Date of Mailing: Mar. 12, 2009, Applicant: Schweitzer Engineering Laboratories, Inc.

Demetrios Tziouvaras, Hector Altuve, Gabriel Benmouyal, Jeff Roberts, Line Differential Protection with Enhanced Characteristic, Jul. 20, 2007.

Jeff Roberts, Stanley Zocholl, Gabriel Benmouyal, Selecting CTs to Optimize Relay Performance, Aug. 1, 1996.

* cited by examiner

SYSTEM, APPARATUS AND METHOD FOR COMPENSATING THE SENSITIVITY OF A SEQUENCE ELEMENT IN A LINE CURRENT DIFFERENTIAL RELAY IN A POWER SYSTEM

CROSS-REFERENCE TO RELATED APPLICATIONS

This application claims benefit under 35 U.S.C. §119(e) of U.S. Provisional Application entitled "The Trajectories of Line Current Differential Faults in the Alpha Plane", filed on Sep. 7, 2005, having Ser. No. 60/715,272, naming Gabriel Benmouyal as inventor, the complete disclosure thereof being incorporated by reference.

BACKGROUND OF THE INVENTION

The present invention generally relates to power system protection, and more specifically, to a system, apparatus and method for compensating the sensitivity of a sequence element in a line current differential relay in a power system.

Electric power systems are designed to generate, transmit and distribute electrical energy to loads. In order to accomplish this, power systems generally include a variety of power system elements such as electrical generators, electrical motors, power transformers, power transmission lines, buses and capacitors, to name a few. As a result, power systems typically include protective devices and associated procedures to protect the power system elements from abnormal conditions such as electrical short circuits, overloads, frequency excursions, voltage fluctuations, and the like.

A protective device and associated procedure acts to isolate some power system element(s) from the remainder of the power system upon detection of the abnormal condition or a fault in, or related to, the power system element(s). Logically grouped zones of protection, or protection zones utilizing the protective devices and procedures, are established to efficiently manage faults or other abnormal conditions occurring in the power system elements.

In general, protection zones may be classified into six types including: (1) generators and generator-transformer elements (2) transformers, (3) buses, (4) lines (transmission, sub-transmission and distribution), (5) utilization equipment (motors, static loads), and (6) capacitor or reactor banks. As a result, a variety of protective devices are required. Such protective devices may include different types of protective relays, surge protectors, arc gaps and associated circuit breakers and reclosers.

Although the fundamentals of power system protection are similar, each of the six types of protection zones uses protective devices that are based on the characteristics of the power system elements in that category. More specifically, different protective relays utilizing a variety of protective schemes (e.g., differential current comparisons, magnitude comparisons, frequency sensing), are required to protect the various power system elements. For example, a line current differential relay, having electrical connections to the transmission line via current transformers (designed to step-down the primary current to a magnitude suitable for use by the line current differential relay), is designed to monitor current flowing in a transmission line by measuring the current flowing into and out of terminal points of the transmission line, and calculating inter alia, the sum of all measured current, or the operate current. As is known, when the transmission line is operating under normal conditions, the sum of all of the (primary) currents entering the line is about zero (Kirchhoff's current law). If the transmission line has a short circuit or is faulted, the corresponding relay operate current will be substantially different from zero, indicating that there is some impermissible path through which a current is flowing. If the operate current exceeds some threshold, or pickup current, and some differential inequality is satisfied, the line current differential relay issues a trip signal to an associated power circuit breaker(s) causing it to open and isolate the faulted bus from the remainder of the power system.

For example, in the case of multi-terminal line using the percentage differential principle, we would have the next criteria for operation . . . , $$I_{operate} > k \cdot I_{restraint}$$

and $$I_{operate} > I_{pu}$$

where $I_{operate} = |\bar{I}_1 + \bar{I}_2 + \bar{I}_3 + \ldots \bar{I}_n|$ or the phasor sum of currents flowing in the protection zone, and $I_{restraint} = (|\bar{I}_1| + |\bar{I}_2| + |\bar{I}_3| + \ldots |\bar{I}_n|)/p$ or the sum of the absolute value of the current phasors representing the current flowing through the protection zone, where k=differential percentage, $I_{pu}$=minimum pickup current value, and p=number of terminals. Thus, the line current differential relay requires that the operate current exceeds a minimum pickup value and some percentage of the total current flowing through the protection zone before the line current differential relay may issue a breaker tripping signal.

Typical protection of a transmission line is generally performed using two line current differential relays coupled to the transmission line via current transformers as described above, with each relay located at different extremities of the line. Such a configuration requires that each differential relay communicates its current and voltage measurement data to the other via a communication channel (e.g., microwave channel, telephone grade channel, fiber optics, etc.).

Providing line current differential protection for a transmission line generally includes incorporation of both phase elements and sequence elements in the line current differential relay; that is, incorporation of an A-phase element, a B-phase element and a C-phase element, and a possibly a zero-sequence or ground element and a negative-sequence element. Depending upon the type of fault detected in the transmission line, one or more of the phase and/or sequence elements will operate to cause the line current differential relay to assert and subsequently issue a trip signal to an associated power circuit breaker(s). For example, in the case of an A-phase-to-ground fault, the A-phase element, the zero-sequence element, and the negative-sequence element may operate.

As is known, however, some or all of the A-phase element, the zero-sequence element, and/or the negative-sequence element may fail to operate properly when certain conditions exist. For example, if the fault resistance, $R_f$ of the A-phase-to-ground fault is above the resistive limit of sensitivity, the A-phase element may fail to properly detect the fault. In other words, under certain circumstances (such as an overloaded line, a highly resistive fault, a pole-open condition), an unbalanced network condition, or a cross-country fault condition, some or all of the A-, B- and/or C-phase current elements ("phase elements" ), and the zero-sequence phase element and/or the negative-sequence phase element ("sequence elements" ) may "lose their sensitivity to detect a fault condition". Accordingly, a fault may go undetected by some or all of the three phase and/or the two sequence elements of the line current differential relay(s), possibly resulting in removal from operation a larger portion of the power system network by the back-up protection.

SUMMARY OF THE INVENTION

In general, a system, an apparatus and a method is provided in a current differential protective device to compensate for, or to adjust the sensitivity of, the negative- and zero-sequence elements of the current differential protective device in order to ensure their proper operation during a phase-to-ground fault with a high fault resistance, occurring during a pole-open condition.

In accordance with an aspect of the invention, an apparatus and method compensate the sensitivity of a line current differential element of a first current differential relay providing differential protection for a transmission line of a power system during a single-phase pole-open condition. One apparatus includes a first delta filter configured to remove a first pre-fault current from a first fault current of the transmission line to form a compensated first current. The apparatus also includes a second delta filter configured to remove a second pre-fault current from a second fault current of the transmission line to form a compensated second current. The line current differential element is configured to receive the compensated first and second current phasors to compensate the sensitivity of the at least one line current differential element. The first current differential relay is operatively coupled to a first end of the transmission line and in communication with a second current differential relay operatively coupled to a second end of the transmission line. In operation, the apparatus derives a first pre-fault current phasor from instantaneous values of the first pre-fault current measured by the first current differential relay. It also derives a first fault current phasor from instantaneous values of the first fault current measured by the first current differential relay. Subtraction of the first pre-fault current phasor from the first fault current phasor forms the first phasor. The apparatus also derives a second pre-fault current phasor from instantaneous values of the second pre-fault current measured by and received from the second current differential relay and derives a second fault current phasor from instantaneous values of the second fault current measured by and received from the second current differential relay. Subtraction of the second pre-fault current phasor from the second fault current phasor forms the second phasor. The line current differential element may be a zero-sequence current element, a negative-sequence current element, A-phase current element, a B-phase current element or a C-phase current element.

In accordance with an aspect of the invention, a method compensates the sensitivity of a line current differential element of a first current differential relay providing differential protection for a transmission line of a power system during a single-phase pole-open condition. The method includes removing a first pre-fault current from a first fault current of the transmission line to form a compensated first current, removing a second pre-fault current from a second fault current of the transmission line to form a compensated second current, and providing a first phasor representative of the compensated first current and a second phasor representative of the second compensated current to the line current differential element to compensate the sensitivity of the line current differential element.

In accordance with another aspect of the invention, a system compensates the sensitivity of a first line current differential sequence element of a local current differential relay. The local current differential relay is operatively coupled to a first end of a transmission line of a power system and in communication with a remote current differential relay operatively coupled to a second end of the transmission line. The system includes a first delta filter operatively coupled to the first line current differential sequence element. The first delta filter includes a first delay filter configured to receive a first local sequence current phasor at a first time and to generate a first delayed local sequence current phasor at a second time. The first delta filter also includes a first adder configured to subtract the first delayed local sequence current phasor from a second local sequence current phasor received at the second time to form a compensated local sequence current phasor. The system also includes a second delta filter operatively coupled to the first line current differential sequence element. The second delta filter includes a second delay filter configured to receive a first remote sequence current phasor at the first time and to generate a first delayed remote sequence current phasor at the second time. The second delta filter also includes a second adder configured to subtract the first delayed remote sequence current phasor from a second remote sequence current phasor received at the second time to form a compensated remote sequence current phasor. The first line current differential element is configured to receive each of the compensated local and remote sequence current phasors to compensate the sensitivity of the first line current differential element.

In accordance with yet another aspect of the invention, an apparatus for compensates the sensitivity of at least one line current differential sequence element of a local current differential relay during a single-phase pole-open condition of a transmission line of a power system. The local current differential relay is operatively coupled to a first end of the transmission line and in communication with a remote current differential relay operatively coupled to a second end of the transmission line. The apparatus includes a first delta filter configured to remove a pre-fault local current contribution from each of a plurality a local current phasors calculated by the local current differential relay using instantaneous local current values measured during a fault in the transmission line to form a plurality of compensated local current phasors. The apparatus also includes a second delta filter configured to remove a pre-fault remote current contribution from each of a plurality a remote current phasors calculated by the local current differential relay using instantaneous remote current values measured by the remote current differential relay during the fault to form a plurality of compensated second current phasors. The pre-fault local current contribution is latched into a memory of the first delta filter, and the pre-fault remote current contribution is latched into a memory of the second delta filter. The at least one line current differential element is configured to receive corresponding local and remote sequence current phasors of the plurality of compensated local and remote sequence current phasors to compensate the sensitivity of the at least one line current differential element.

In accordance with another aspect of the invention, a method is provided to compensate the sensitivity of a line current differential sequence element of a local current differential relay during a single-phase pole-open condition of a transmission line of a power system. The local current differential relay is operatively coupled to a first end of the transmission line and in communication with a remote current differential relay operatively coupled to a second end of the transmission line. The method includes subtracting a pre-fault local current phasor from each of a plurality of local current phasors derived from instantaneous local current values measured by the local current differential relay during a fault in the transmission line to form a plurality of compensated local current phasors. The pre-fault local current phasor is stored in a first memory location of the local current differential relay. The method also includes subtracting a pre-fault remote current phasor from each of a plurality of remote current phasors derived from instantaneous remote current values measured by the remote current differential relay during the fault to form a plurality of compensated second current phasors. The pre-fault remote current phasor is stored in a second memory location of the local current differential relay. Pairs of corresponding local and remote sequence current phasors of the plurality of compensated local and remote sequence current phasors are provided to the line current differential element to compensate the sensitivity of the line current differential element In accordance with a further aspect of the invention, a system compensates the sensitivity of a first line current differential sequence element of a local current differential relay. The local current differential relay is operatively coupled to a first end of the transmission line and in communication with a remote current differential relay operatively coupled to a second end of the transmission line. The system includes a first adder, a first memory register and a first delay filter operatively coupled to the first adder and first memory register. The first delay filter is configured to delay a local sequence current phasor calculated prior to detecting an occurrence of a fault in the transmission line. The first memory register is configured to store the delayed local sequence current phasor to form a stored local sequence current phasor in response to receipt of a latching signal indicating the fault. The first adder is configured to subtract one of the delayed local sequence current phasor and the stored local sequence current phasor from each of a plurality of local sequence current phasors calculated after the fault to form a plurality of compensated local sequence current phasors. The system also includes a second adder, a second memory register and a second delay filter operatively coupled to the second adder and the second memory register. The second delay filter is configured to delay a remote sequence current phasor calculated prior to the fault. The second memory register is configured to store the delayed remote sequence current phasor to form a stored remote sequence current phasor in response to receipt of the latching signal. The second adder is configured to subtract one of the delayed remote sequence current phasor and the stored remote sequence current phasor from each of a plurality of remote sequence current phasors calculated after the fault to form a plurality of compensated remote sequence current phasors. Pairs of corresponding compensated local and remote sequence current phasors of the plurality of compensated local and remote sequence current phasors are provided to the first line current differential element to compensate the sensitivity of the first line current differential element.

In accordance with yet a further aspect of the invention, an apparatus for compensates the sensitivity of a line current differential element of a protective relay providing differential protection for a transmission line of a power system. The apparatus includes a delta filter arrangement configured to form compensated first and second current phasors based upon corresponding first and second pre-fault and fault current phasors. The delta filter arrangement includes a first delta filter coupled to receive the first pre-fault and fault current phasors and to generate the compensated first current phasor. The delta filter arrangement also includes a second delta filter coupled to receive the second pre-fault and fault current phasors and to generate the compensated second current phasor. Each of the first and second pre-fault and fault current phasors is derived from corresponding measured currents at first and second locations of the transmission line.

In accordance with still a further aspect of the invention, a method compensates the sensitivity of a line current differential element of a protective relay providing differential protection for a transmission line of a power system. The method includes forming a compensated first signal based on a first pre-fault current and a first fault current measured at a first end of the transmission line, and forming a compensated second signal based on a second pre-fault current and a second fault current measured at a second end of the transmission line. The method also includes providing compensated first and second current phasors to the current differential element thereby compensating the line current differential element. Each of the compensated first and second current phasors is derived from corresponding compensated first and second signals.

It should be understood that the present invention includes a number of different aspects and/or features which may have utility alone and/or in combination with other aspects or features. Accordingly, this summary is not an exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

DETAILED DESCRIPTION OF THE PREFERRED EMBODIMENTS

As will be explained in detail below, it can be shown mathematically and with current-ratio trajectories in an alpha plane that the current-ratios utilized by the A-phase, the B-phase and the C-phase elements and the negative and zero sequence elements depend on many factors, for example on the fault resistance and the associated impedances. Each current-ratio trajectory is computed as a phasor ratio of the two corresponding phase (or sequence) currents entering and leaving the protected transmission line (e.g. the "local" A-phase current and the "remote" A-phase current), as measured by two communicating line current differential relays placed a distance from each other on the protected transmission line. It will also be shown below that for higher fault resistances under a variety of circumstances, a current-ratio trajectory that should fall within a trip area of the alpha plane may instead fall in a stability area of the alpha plane and therefore go undetected.

An apparatus and method are provided in a protective device to compensate, or adjust the sensitivity of, the negative- and zero-sequence elements of the protective device in order to ensure their proper operation during a phase-to-ground fault with a high fault resistance, occurring during a pole-open condition. As practiced herein, the method includes removal of the pre-fault zero-sequence current from both of the zero-sequence currents forming the zero-sequence current ratio used by the zero-sequence element, and removal of the pre-fault negative-sequence current from both of the negative-sequence currents forming the negative-sequence current ratio used by the negative-sequence element. It is contemplated that another embodiment of the invention may include attenuation, rather than total removal, of the pre-fault zero-sequence current and/or the pre-fault negative-sequence current from respective zero-sequence and negative-sequence currents.

For ease of discussion, aspects of the present invention can be more fully understood by limiting the detailed discussion to a protection zone that includes a three-phase transmission line protected by two line current differential relays located at the extremities of the transmission line and in communication with each other. The first line current differential relay is designated as a local line current differential relay and the second line current differential relay is designated as a remote line current differential relay. Both of these are coupled to the transmission line via respective primary current transformers. It should be noted however that the apparatus and method disclosed herein are applicable for protecting both short and long transmission/distribution lines experiencing a variety of conditions such as high resistive faults and overload conditions.

Figure 1:
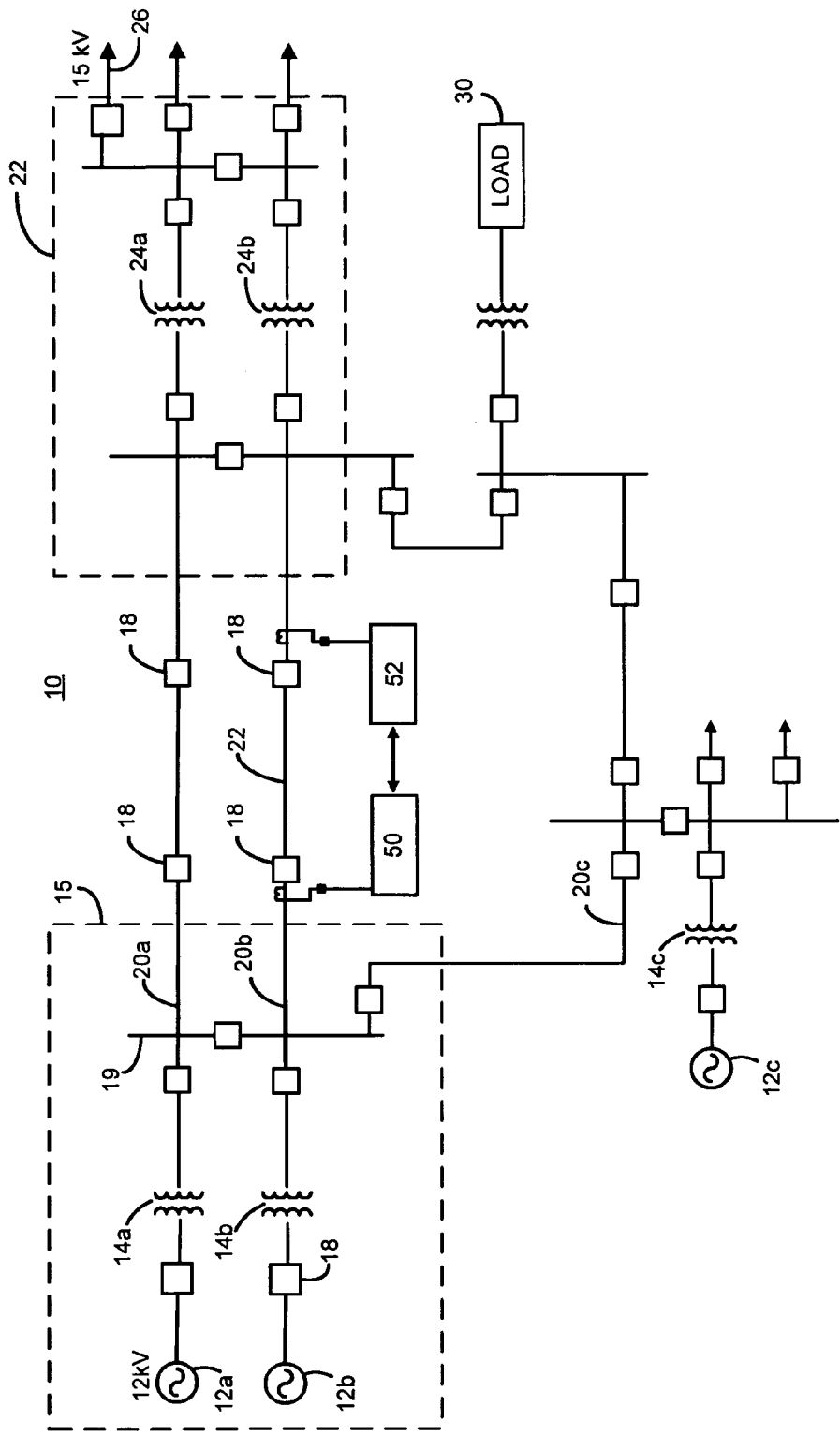
FIG. 1 is a single line schematic diagram of a power system that may be utilized in a typical wide area.

FIG. 1 is a single line schematic diagram of a power system 10 that may be utilized in a typical wide area. As illustrated in FIG. 1, the power system 10 includes, among other things, three generators 12a, 12b and 12c configured to generate three-phase sinusoidal waveforms, for example, to generate three-phase 12 kV sinusoidal waveforms. The power system 10 also includes three step-up power transformers 14a, 14b and 14c configured to increase the generated three-phase sinusoidal waveforms to a higher voltage such as 138 kV, and a number of circuit breakers 18 that operate to disconnect respective portions of the power system from the remainder of the power system 10 during an associated trip condition. The step-up power transformers 14a, 14b, 14c provide the higher voltage sinusoidal waveforms to a number of long distance transmission lines such as the transmission lines 20a and 20b. In an embodiment, a first substation 15 may be defined to include the generators 12a, 12b, two of the step-up transformers 14a, 14b and associated circuit breakers 18 interconnected via a first bus 19. At the end of the long distance transmission lines 20a, 20b, a second substation 22 includes two step-down power transformers 24a and 24b to transform the higher voltage sinusoidal waveforms to lower voltage sinusoidal waveforms (e.g., 15 kV) suitable for distribution via distribution lines to the end-users 26 and/or loads 30.

As previously mentioned, the power system 10 utilizes many types of protective devices and associated procedures to protect the power system elements from faults or other abnormal conditions. In the illustrated example, the power system 10 also includes a first line current differential relay designated as a local line current differential relay 50 ("local differential relay 50") and a second line current differential relay designated as a remote line current differential relay 52 ("remote differential relay 52"). The differential relays 50 and 52 are used to protect a transmission line, denoted as a transmission line 22, from faults occurring between respective circuit breakers 18.

In addition to the percentage differential principle described above, current differential relays such as the differential relays 50 and 52 may be implemented via line current differential elements such as A-phase, B-phase and/or C-phase current elements, and/or zero-sequence and negative-sequence current elements. Such line current differential elements are configured to periodically calculate a current ratio of a local current (current entering the transmission line) and a remote current (current leaving the transmission line), and then to compare each calculated current ratio to a characteristic, or an area of stability, imbedded in an alpha plane of the line current differential element. In a preferred embodiment, each current ratio includes the ratio of two phasors representative of the local and remote currents; a complex number. Accordingly, the alpha plane is a complex plane (i.e., a plane having one real axis and one imaginary axis) where the trajectory of the each current ratio is geometrically represented. A more detailed description of line current differential protection using a characteristic imbedded in an alpha plane is provided by U.S. Pat. No. 6,590,397, entitled "Line Differential Protection System for a Power Transmission Line", issued on Jul. 8, 2003, to Jeffrey B. Roberts, assigned to Schweitzer Engineering Laboratories, Inc., the contents of which are hereby incorporated by reference.

For purposes of describing the subsequent calculations shown via Equations (1) through (69), the local differential relay 50 is positioned on the "left-side" or the local end, while the remote differential relay 52 is positioned on the "right-side" or the remote end of the transmission line.

Figure 2:
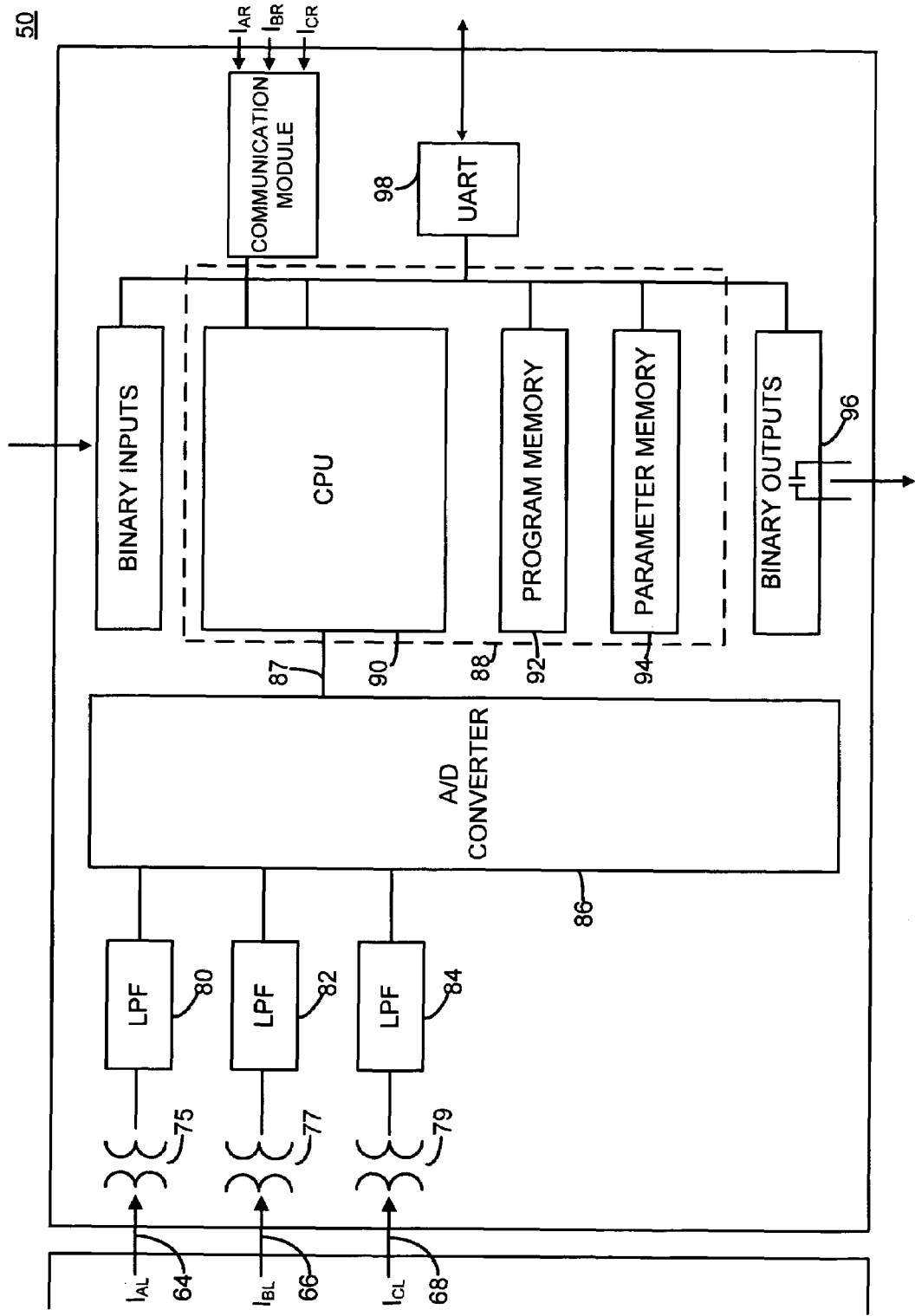
FIG. 2 is a block diagram of an exemplary configuration of the local line current differential relay of FIG. 1, according to an embodiment of the invention.

FIG. 2 is a block diagram of an exemplary configuration of the local differential relay 50. As noted above, the local differential relay 50 is coupled to the transmission line 22 via current transformers that operate to step down the primary three-phase current to secondary currents suitable for use by the relay. Referring to FIG. 2, secondary current waveforms 64, 66, and 68, received via the current transformers, are illustrated as $I_A$, $I_B$ and $I_C$. Although only secondary current waveforms 64, 66 and 68 are shown in FIG. 2 for ease of illustration and discussion, it should be understood that additional secondary current waveforms may be utilized by the local differential relay 50.

During operation, secondary current waveforms 64, 66 and 68 received by the local differential relay 50 are further transformed into corresponding voltage waveforms via respective current transformers 75, 77 and 79 and resistors (not separately illustrated), and filtered via respective low pass filters 80, 82 and 84. An analog-to-digital (A/D) converter 86 multiplexes, samples and digitizes the filtered secondary current waveforms to form corresponding digitized current waveform signals 87.

As shown in FIG. 2, the A/D converter 86 is coupled to a microcontroller 88 having a microprocessor 90 (or FPGA), a program memory 92 (e.g., a Flash EPROM) and a parameter memory 94 (e.g., an EEPROM). The microprocessor 90 executing a computer program or relay logic scheme (discussed below) processes each of the digitized current signals to extract corresponding phasors, in this case current phasors and sequence quantity phasors, and then performs various calculations using the extracted phasors (and received phasor quantities) to determine whether a short circuit exists in the transmission line 22. If a short circuit is detected, the microprocessor 90 will cause binary output contacts 96 to be closed, thereby opening an associated power circuit breaker to isolate the portion of the transmission line 22 experiencing the short circuit from the remainder of the power system 10. The local differential relay 50 also includes a receiver/transmitter means such as, for example, a UART 98, configured to enable transmission of phasor quantities to the remote differential relay 52 and to enable receipt of phasor quantities from the remote differential relay 52. Although not separately discussed, the remote differential relay 52 is substantially similarly configured and operable.

As is known, for a balanced power system with an A-, B-, C-phase sequence, each of the phasors derived from the three secondary current waveforms 64, 66 and 68 is of equal magnitude and has a phase shift of 120 degrees. For example, when expressed as complex numbers or phasors, $\bar{I}_A = I\angle 0°$, $\bar{I}_B = I\angle -120°$, and $\bar{I}_C = I\angle 120°$, under "balanced" conditions, the three phasors rotate counterclockwise.

As is also known, a fault condition (e.g., an A-phase-to-ground fault) typically results in an "unbalanced" condition yielding, for example, A-, B- and C-current phasors having varied magnitudes with phase angles that are not 120 degrees apart. The level of unbalance can be assessed by computing, at each line extremity and therefore in each relay, the negative (I2) and the zero (I0) sequence phasors as provided by:

$$I2 = \tfrac{1}{3}(I_A + a^2 I_B + a I_C) \quad \text{Negative sequence current phasor}$$

$$I0 = \tfrac{1}{3}(I_A + I_B + I_C) \quad \text{Zero sequence current phasor}$$

where a is the complex operator:

$$a = \angle 120°$$

As is also known, during normal balanced power system conditions, both the negative and zero sequence phasor magnitude are close to zero.

Figure 3:
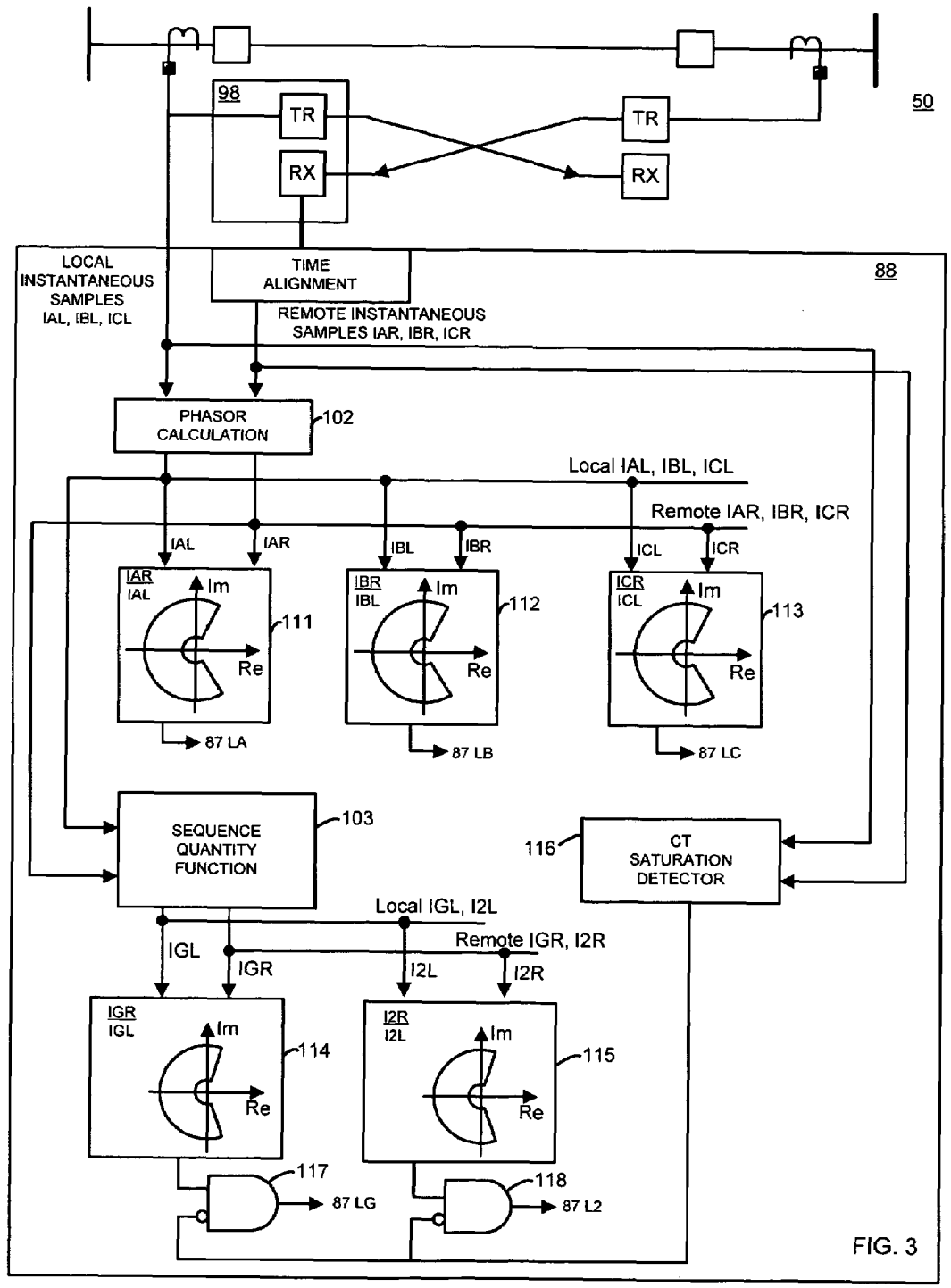
FIG. 3 is a block diagram of the logic of the local line current differential relay of FIG. 1, according to an embodiment of the invention.

FIG. 3 is a block diagram of relay logic of the local line current differential relay 50 according to an embodiment of the invention. Although only the relay logic of local differential relay 50 is discussed in detail, it should be noted that the remote line current differential relay 52 is equivalently configured and operable.

The relay logic includes a phasor calculation function 102 where three-phase current phasors are extracted from both local digitized current signals of the local differential relay 50 and time-aligned remote digitized current signals received from the remote differential relay 52. The current phasors, denoted as $I_{AL}$, $I_{BL}$, $I_{CL}$, $I_{AR}$, $I_{BR}$, $I_{CR}$, represent the local A-phase current, the local B-phase current, the local C-phase current, the remote A-phase current, the remote B-phase current and the remote C-phase current, respectively.

The relay logic also includes a sequence quantity function 103 where a local zero-sequence current phasor denoted as $I_{GL}$, a remote zero-sequence current phasor denoted as $I_{GR}$, a local negative-sequence current phasor denoted as $I_{2L}$ and a remote negative-sequence current phasor denoted as $I_{2R}$, are calculated using the three-phase current phasors $I_{AL}$, $I_{BL}$, $I_{CL}$, $I_{AR}$, $I_{BR}$, $I_{CR}$. Also included are three phase elements; an A-phase element 111 configured to generate a binary output 87LA, a B-phase element 112 configured to generate a binary output 87LB, and a C-phase element 113 configured to generate a binary output 87LC, and two sequence elements. The zero-sequence or ground element 114 is configured to generate a binary output 87LG and a negative-sequence element 115 is configured to generate a binary output 87L2.

Typically during operation, the A-phase element 111 will pickup in the event of an A-phase-to-ground fault, the B-phase element 112 will pickup in the event of a B-phase-to-ground fault, and the C-phase element 113 will pickup in the event of a C-phase-to-ground fault. Unfortunately in some cases of high fault resistances, the A-phase element 111, B-phase element 112 or C-phase element 113 may become blind to a phase-to-ground fault and fail to pick-up and subsequently issue a trip signal. As a result, the zero sequence element 114 and the negative sequence element 115 are included in the relay logic because they operate regardless of the fault resistance. Unlike the A-phase element 111, B-phase element 112 or C-phase element 113, neither the zero sequence element 114 nor the negative sequence element 115 can detect a "balanced" three-phase fault.

Referring again to FIG. 3, further included is a CT saturation detector 116 that operates to "supervise" the zero and sequence elements 114, 115 such that their respective outputs 87LG and 87L2 are blocked if saturation is detected on any of the current transformers associated with the three-phase current phasors $I_{AL}$, $I_{BL}$, $I_{CL}$, $I_{AR}$, $I_{BR}$, $I_{CR}$. A first AND-gate 1 17 and a second AND-gate 118 are included to enable blocking of the outputs 87LG and 87L2 in the event of current transformer saturation. The first AND-gate 117 includes a first input coupled to the zero-sequence element output and a second inverting input coupled to an output of the CT saturation detector 116, and the second AND-gate 118 includes a first input coupled to the negative-sequence element output and a second inverting input coupled to the output of the CT saturation detector 116.

Each of the A-phase element 111, the B-phase element 112, the C-phase element 113, the zero-sequence element 114 and the negative-sequence element 115 operate with respect to an alpha plane having a real and an imaginary axis. As noted above, current-ratio trajectories (e.g., $I_{AR}/I_{AL}$) in the alpha plane are computed as a phasor ratio of the two corresponding phase (or sequence) currents entering and leaving the transmission line 22. In general, the alpha plane provides a geometrical representation of the current-ratio trajectories in the complex plane. It is well established that any percentage differential characteristic can be mapped into the alpha plane such that the area of stability ("stability area" ) where tripping does not occur, and the area of tripping ("trip area" ) where tripping does occur, can be determined as a function of basic relay characteristic parameters.

Figure 4:
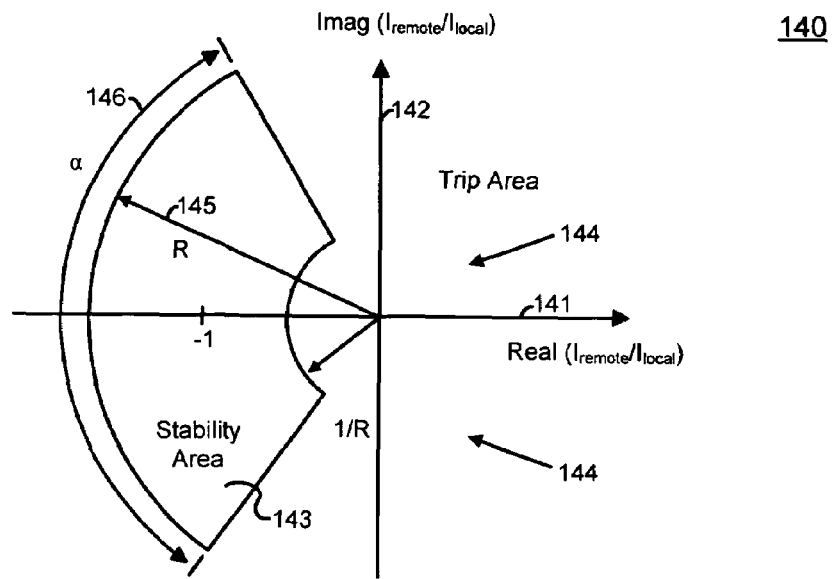
FIG. 4 is an exemplary alpha-plane that may be used to determine a trip condition based on current ratio trajectories calculated by the local and remote line current differential relays of FIG. 1.

For example, FIG. 4 is an exemplary alpha-plane 140 that may be used to determine a trip condition based on a current ratio trajectory. As illustrated, a differential element characteristic is embedded in the alpha-plane 140. Referring to FIG. 4, the alpha-plane 140 includes a real axis 141, an imaginary axis 142, a stability area 143 configured in a rainbow fashion, and a trip area 144. Current ratios are computed by dividing the remote current by its corresponding local current. For example, when computing an A-phase current ratio phasor, the remote A-phase current phasor $I_{AR}$ is divided by the A-phase local current phasor $I_{AL}$. The resulting current ratio, having a real and an imaginary part in most cases, is plotted as vector on the alpha-plane 140. The trajectory of the vector, or the current-ratio trajectory, either in the trip area 144 or the stability area 143, is determinative of whether the corresponding current element binary output (e.g., 87LA) has high value (e.g., 1) or a low value (e.g., 0). It should be noted that prior to computing the current ratio, verification is made that the absolute value of the sum of the local and remote current phasors (e.g., $|I_{AL}+I_{AR}|$) is greater than a minimum pickup current (a.k.a., the element differential pickup current).

In a no-fault situation, the current ratio is close to the minus one point (−1, 0). There are two settings for this characteristic, the radius R 145 of the greater arc (typically between 5 and 10) and the angle alpha 146 (("α") typically between 160 and 210 degrees). Adjusting the angle alpha α 146 provides additional operational control in cases of current transformer saturation or applications such series compensated transmission lines.

The current ratio trajectory resulting from a fault occurring on the transmission line 22 may be affected by a number of factors. These factors include the nature of the current ratio, phase or sequence currents, the transmission line loading and length, the level of fault resistance, the level of current transformer saturation, if any, the presence of a pole open, and the presence of capacitive series compensation. The most complex current ratio trajectories will depend upon a combination of these factors.

Referring again to FIG. 3, the A-phase current ratio $I_{AR}/I_{AL}$ is calculated by the A-phase element 111 to generate the binary output 87LA, the B-phase current ratio $I_{BR}/I_{BL}$ is calculated by the B-phase element 112 to generate the binary output 87LB, and the C-phase current ratio $I_{CR}/I_{CL}$ is calculated by the C-phase element 113 configured to generate the binary output 87LC. The zero-sequence current ratio $I_{GR}/I_{GL}$ is calculated by the zero-sequence element 114 to generate the binary output 87LG and the negative-sequence current ratio $I_{2R}/I_{2L}$ is calculated by the negative-sequence element 115 to generate the binary output 87L2. While referred to as current elements 110-115 calculating their respective current ratios, it should be noted that that the calculations are performed by the microcontroller 88 executing a line current differential protection program or logic.

As noted above, fault resistance $R_F$ is a factor in the determining current ratios trajectories calculated by their respective current elements 110-115.

Figure 5:
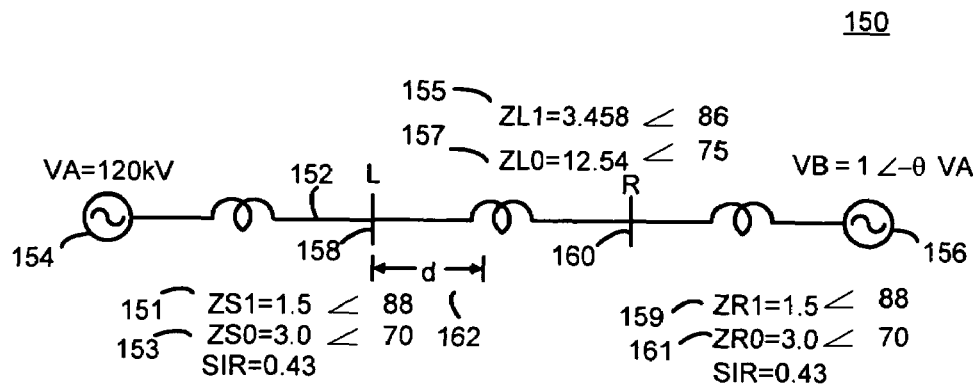
FIG. 5 is an exemplary schematic diagram of a short transmission line having negligible shunt capacitance, according to an embodiment of the invention.

FIG. 5 is an exemplary schematic diagram 150 of a short transmission line 152 having negligible shunt capacitance, that may be used to understand the relationship between current ratio trajectories and fault resistance $R_F$. For ease of discussion, an A-phase-to-ground internal fault at a location d 162 on the short transmission line 152 is assumed.

Referring to FIG. 5, in addition to the short transmission line 152, the schematic diagram 150 includes first and second generators 154 and 156, a first (left) bus 158 and a second (right) bus 160. The first generator 154 is assumed to generate a voltage VA and the second generator 156 is assumed to generate a voltage VB where VB=1∠−θ VA. Three sets of impedances are illustrated: (1) left-side source positive- and zero-sequence impedances ZS1 151 and ZS0 153 are illustrated between the first generator 154 and the left bus 158; (2) line positive- and zero-sequence impedances ZL1 155 and ZL0 157 are illustrated between the left bus 158 and the right bus 160; and (3) right-side positive- and zero-sequence impedances ZR1 159 and ZR0 161 are illustrated between the right bus 160 and the second generator 156. The phase angle θ difference, or load angle, between the voltages generated by the first and second generators 154, 156, determines the amount of line loading.

Resolution of an Internal Single-Phase-to-Ground Fault—Phase Elements

Figure 6:
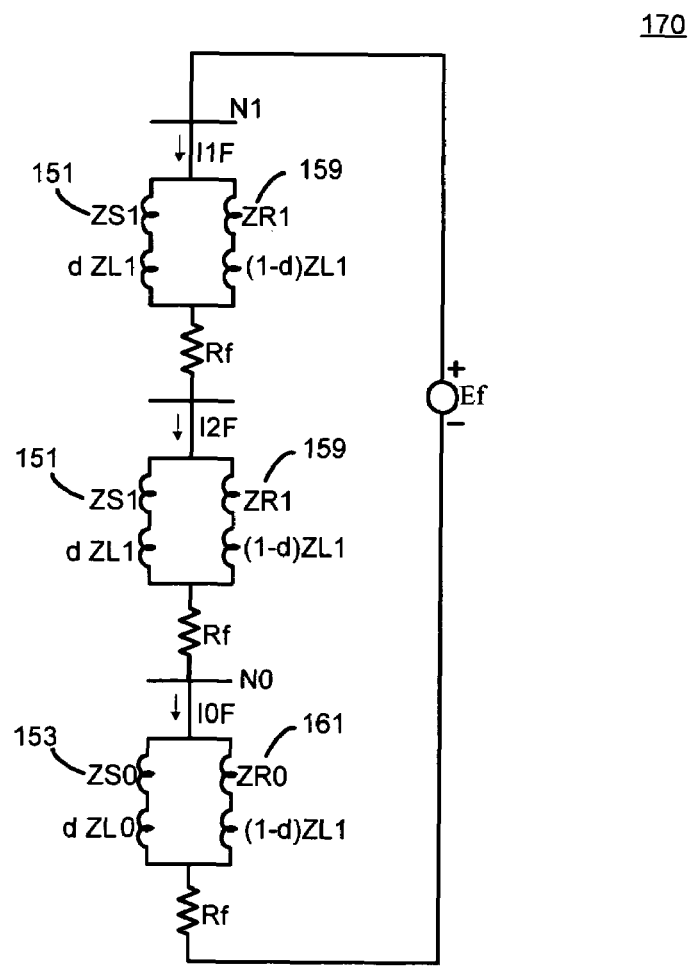
FIG. 6 is sequence network diagram that may be used to resolve an A-phase-to-ground fault at a location d of the short transmission line of FIG. 5.

A fault occurring on a transmission line, such as an A-phase-to-ground fault occurring on the short transmission line 152, at the fault location d 162 may be resolved using a sequence network and applying a superposition principle. For example, FIG. 6 is sequence network 170 that may be used to resolve the A-phase-to-ground fault at location d indicated in FIG. 5. The superposition principle includes applying a voltage at the fault location d 162 to the "faulted" sequence network 170. The applied voltage is equal to a voltage existing at the fault location d 162, prior to the fault. A total fault current at some location on the sequence network 170 is equal to the load current existing before the fault, plus the pure-fault current (current void of any load) existing on the faulted network. In other words, upon occurrence of a fault, a total fault current (e.g., 20 KA) is the sum of the pre-fault current or load current (e.g., 1000 A), plus the pure fault current (e.g., 19 KA)

In order to determine the load current prior to the fault, it is helpful to understand the relationship between the (source) voltage at the fault location d 126 and the load current $I_{LD}$. Referring to FIGS. 5 and 6, the voltage existing at the fault location d 162 prior to the fault, or the source voltage $E_f$, may be expressed as:

$$Ef = VA - I_{LD} Z1M \tag{1}$$

where Z1M is the impedance between the left-source VA at the first generator 154 and the fault location d 162 where:

$$Z1M = ZS1 + dZL1 \tag{2}$$

The load current $I_{LD}$ of the short transmission line 152 prior to the fault is provided by:

$$I_{LD} = \frac{(1 - e^{-j\theta})VA}{Z1M + Z1N} \tag{3}$$

where Z1N is defined as:

$$Z1N = ZR1 + (1-d)ZL1 \tag{4}$$

The total impedance ZSOM in front of the source voltage $E_f$ on the sequence network 170 is:

$$ZSOM = \frac{2\ Z1M\ Z1N}{Z1M + Z1N} + \frac{Z0M\ Z0N}{Z0M + Z0N} + 3Rf \tag{5}$$

with Z0M and Z0N being defined as:

$$Z0M = ZS0 + dZL0 \tag{6}$$

$$Z0N = ZR0 + (1-d)ZL0 \tag{7}$$

Upon an occurrence of the A-phase-to-ground fault, the positive-sequence current I1F at the fault location d 162, or the pure fault positive-sequence current, is equal to the source voltage $E_f$ divided by the total impedance, ZSOM:

$$I1F = \frac{Ef}{ZSOM} \quad (8)$$

The negative-sequence current and zero-sequence current at the fault, I2F and I0F, respectively, are equal to the pure fault positive-sequence current IF at the fault location d 162:

$$I2F = I1F \quad (9)$$

$$I0F = I1F \quad (10)$$

The left-side positive-sequence current I1L, the left-side negative-sequence current I2L and the left-side zero-sequence current I0L at the relay location close to the left bus 158 are provided as:

$$I1L = C1 * I1F \quad (11)$$

$$I2L = C1 * I1F \quad (12)$$

$$I0L = C0 * I1F \quad (13)$$

where C1 and C0 are the sequence current distribution factors at the relay location close to the left bus 158, and are equal to:

$$C1 = \frac{Z1N}{Z1M + Z1N} \quad (14)$$

$$C0 = \frac{Z0N}{Z0M + Z0N} \quad (15)$$

The right-side positive-sequence current I1R, the right-side negative-sequence current I2R and the right-side zero-sequence current I0R at the relay location close to the right bus 160 are provided as:

$$I1R = (1-C1)I1F \quad (16)$$

$$I2R = (1-C1)I1F \quad (17)$$

$$I0R = (1-C0)I1F \quad (18)$$

The left-side A-phase current at the relay location close to the left bus 158 is:

$$IAL = C1 I1F + C2 I2F + C0 I0F + I_{LD} \quad (19)$$

$$= (2 C1 + C0)I1F + I_{LD}$$

The right-side A-phase current at the relay close to the right bus 160 is:

$$IAR = [2(1-C1)+(1-C0)]I1F - I_{LD} \quad (20)$$

The ratio of the two A-phase currents at the extremities (i.e., the left-side and right-side) of the short transmission line 152 yields:

$$\frac{IAR}{IAL} = \frac{[2(1-C1)+(1-C0)]I1F - I_{LD}}{(2C1+C0)I1F + I_{LD}} \quad (21)$$

-continued $$= \frac{[2(1-C1)+(1-C0)] - \frac{I_{LD}}{I1F}}{(2C1+C0) + \frac{I_{LD}}{I1F}}$$

Accordingly, the current ratio at the relay (either the left-side or right-side) is dependent on the sequence current distribution factors C0 and C1, and the ratio of the load current $I_{LD}$ over the pure fault positive-sequence current IF at the fault location d 162. The load current $I_{LD}$ depends only upon the phase angle θ difference between the voltages generated by the first and second generators 154, 156 and is equal to:

$$I_{LD} = \frac{(1-e^{-j\theta})VA}{ZS1 + ZL1 + ZR1} \quad (22)$$

The pure fault positive-sequence current I1F depends upon the fault location d 162, the sequence current distribution factors C0 and C1 and the fault resistance $R_f$ as expressed by:

$$I1F = \frac{[VA - ILD(ZS1 + d\, ZL1)]}{\left[ \frac{2(ZS1 + d\, ZL1)(ZR1 + (1-d)ZL1)}{ZS1 + ZL1 + ZR1} + \frac{(ZS0 + d\, ZL0)(ZR0 + (1-d)ZL0)}{ZS0 + ZL0 + ZR0} + 3\, Rf \right]} \quad (23)$$

Obviously, as the fault resistance $R_f$ increases, the pure fault positive-sequence current I1F decreases. Starting from equation (21), in a no-fault situation that is equivalent to a fault with infinite resistance, the pure fault positive-sequence current I1F is equal to zero, and the current ratio is simply equal to minus one as shown in equation (24); the ratio of IAR/IAL where $\overline{IAR} = \overline{IAL}$ but are out of phase by 180 degrees. Accordingly, the current ratio falls in the stability area 143 in the alpha plane 140 (see, FIG. 4).

$$\frac{IAR}{IAL} = -1 \quad (24)$$

Also from equation (21), if the load current $I_{LD}$ is equal to zero, the current ratio $$\frac{IAR}{IAL}$$

is independent from the pure fault positive-sequence current IF and therefore from the fault resistance $R_f$. In this situation, the current ratio $$\frac{IAR}{IAL}$$

is dependent only on the sequence current distribution factors C0, C1 as shown is equation (25):

$$\frac{IAR}{IAL} = \frac{[2(1-C1) + (1-C0)]}{(2C1+C0)} \quad (25)$$

When two constants, a and b, are defined as:

$$a = 2C1 + C0$$

$$b = 2(1-C1) + (1-C0) \quad (26)$$

the A-phase current ratio, or A-phase fault current ratio $$\frac{IAR}{IAL},$$

can be expressed as a ratio of the load current $I_{LD}$ to pure fault positive-sequence current IF as shown in equation (27):

$$\frac{IAR}{IAL} = \frac{b - \frac{I_{LD}}{I1F}}{a + \frac{I_{LD}}{I1F}} \quad (27)$$

Equation 27 indicates that the A-phase current ratio depends upon another ratio of the load current (current flowing into the A-phase line prior to the fault) upon the pure fault positive-sequence current I1F at the fault. As a general rule, the A-phase element becomes insensitive to a fault when the ratio of the load current over pure fault positive-sequence current I1F assumes low values. This occurs when either the fault resistance $R_f$ is high (and consequently the pure fault positive-sequence current I1F is reduced) or the network impedances are increased (and consequently the pure fault positive-sequence current I1F is reduced). In cases where load current $I_{LD}$ is close to zero, the A-phase fault current ratio $$\frac{IAR}{IAL},$$

is independent from the fault resistance, the sources magnitudes and phase angle difference. As a result, the A-phase fault current ratio $$\frac{IAR}{IAL}$$

depends only upon the network impedances and the distance d to the fault.

As noted above, in some instances, the phase elements 111, 112 and 113 can become insensitive to a fault due to a decrease in the pure fault positive-sequence current I1F below a threshold value, depending on either the fault resistance $R_f$ or the value of the positive- and zero-sequence source impedances. Referring to equation (23), there are two situations where the pure fault positive-sequence current I1F is reduced such that the load to pure fault current ratio $$\frac{I_{LD}}{I1F}$$

is increased to a point where the associated A-, B- and C-phase element 111, 112 or 113 loses its sensitivity and therefore does not properly detect a fault. In one situation, the pure fault positive-sequence current I1F may be reduced via increasing the fault resistance $R_f$. For a single phase-to-ground fault, there is a maximum value of fault resistance $R_f$ beyond which the associated phase element 111, 112 or 113 becomes blind to the fault. Thus, for a fault resistance $R_f$ higher than a threshold value, the phase elements 111, 112 and 113 become blind to the fault.

Resolution of an Internal Single-Phase-to-Ground Fault—Sequence Elements

Under normal conditions, unlike the A-, B- and C-phase elements 111-113, the zero-sequence element 114 and the negative-sequence 115 operate irrespective of a magnitude of the fault resistance $R_f$ and are therefore considered more "sensitive" to fault conditions. Accordingly, the sequence elements 114 and 115 are typically added to a relay's current differential protective scheme in order to detect highly resistive faults that may go undetected by phase elements 111-113 that have become insensitive to the fault.

For example, referring again to equations (11)-(18) and FIGS. 4 and 5, the current ratio of the zero-sequence currents ("zero-sequence current ratio") at the extremities of the transmission line 152 is:

$$\frac{I0R}{I0L} = \frac{(1-C0)I0F}{C0I0F} \quad (28)$$

$$= \frac{(1-C0)}{C0}$$

$$= \frac{dZL0 + ZS0}{(1-d)ZL0 + ZR0}$$

Similarly, the current ratio of the negative-sequence currents ("negative-sequence current ratio") at the extremities of the transmission line 152 is:

$$\frac{I2R}{I2L} = \frac{(1-C1)I1F}{C1I1F} \quad (29)$$

$$= \frac{(1-C1)}{C1}$$

$$= \frac{dZL1 + ZS1}{(1-d)ZL1 + ZR1}$$

As shown in equations (28) and (29), neither the zero-sequence current ratio nor the negative-sequence current ratio are dependent on the load current $I_{LD}$, the load angle, the pure fault positive-sequence current ratio $$\frac{I_{LD}}{I1F}$$

192 or fault resistance $R_f$. Instead, the current ratios are only dependant on the sequence current distribution factors C0, C1 and accordingly, on the fault location d and the sequence network impedances (e.g., ZR1, ZL1, ZS1).

As a result, if the impedances associated with the first and second generators 154, 156 are equal, and the fault location d 162 is equidistant from both the first and second generators 154,156, both the zero-sequence current ratio $$\frac{I0R}{I0L}$$

and the negative-sequence current ratio $$\frac{I2R}{I2L}$$

yield trajectories equal to (1, 0) in the alpha plane 140; i.e., trajectories in the trip area 144.

In order to accommodate natural unbalances (e.g., unbalanced current transformers) in the power system network 10, however, the zero-sequence and negative-sequence elements 114 and 115 of FIG. 3 utilize a minimum sequence (negative or zero) differential pick-up current. As a result, they will lose sensitivity beyond a very high value of the fault resistance $R_f$.

As noted above, the load current $I_{LD}$ is the current that existed in the transmission line 152 prior to an occurrence of the fault. Referring again to the A-, B- and C-phase elements 111-113, equation (21) and equation (30), if the load current $I_{LD}$ is removed from the A-phase current ratio $$\frac{IAR}{IAL},$$

like the zero-sequence current ratio $$\frac{I0R}{I0L}$$

and the negative-sequence current ratio $$\frac{I2R}{I2L},$$

the A-phase current ratio depends only on the sequence current distribution factors C0, C1 and accordingly, on the fault location d 162 and the sequence network impedances ZR1, ZL1, ZS1, and not on the fault resistance $R_f$.

$$\frac{IAR - IAR_{prefit}}{IAL - IAL_{prefit}} = \frac{[2(1-C1)+(1-C0)I1F - I_{LD} + I_{LD}]}{(2C1+C0)I1F + I_{LD} - I_{LD}} \quad (30)$$

$$= \frac{2(1-C1)+(1-C0)}{2C1+C0}$$

As a result, via removing the load current $I_{LD}$ from the calculation of the phase current ratios $$\frac{IAR}{IAL}, \frac{IBR}{IBL} \text{ and } \frac{ICR}{ICL},$$

the A-, B- and C-phase elements 111-113 may become immune from the undesirable effects of the higher fault resistance $R_f$ during normal operation.

As noted above, in cases where the appropriate phase element fails to respond due to a high fault resistance, one or both of the sequence elements 114, 115 will typically pick-up upon an occurrence of a fault because they will respond irrespective of the fault resistance. There are however, situations where the zero-sequence element 114 and the negative-sequence 115 may also fail to operate properly at high fault resistance $R_f$.

If (1) an occurrence of a faulted phase (e.g., a B-phase-to-ground fault) results in a B-pole open condition, and then (2) a fault occurs on one or both of the remaining two phases (e.g., an A-phase-to-ground fault), the zero-sequence element 114 and/or the negative-sequence 115 may fail to operate properly for highly resistive faults (i.e., high fault resistance) $R_f$. As illustrated below using, (A) calculations of a pole-open only (pre-fault condition), followed by (B) calculations of the pole-open condition with the addition of a concurrent single phase-to-ground fault (a post-fault condition), the failure of the sequence elements to operate for highly resistive faults may be shown.

Resolution of a B-Phase Pole Open condition—Pre-fault Calculations

Figure 7:
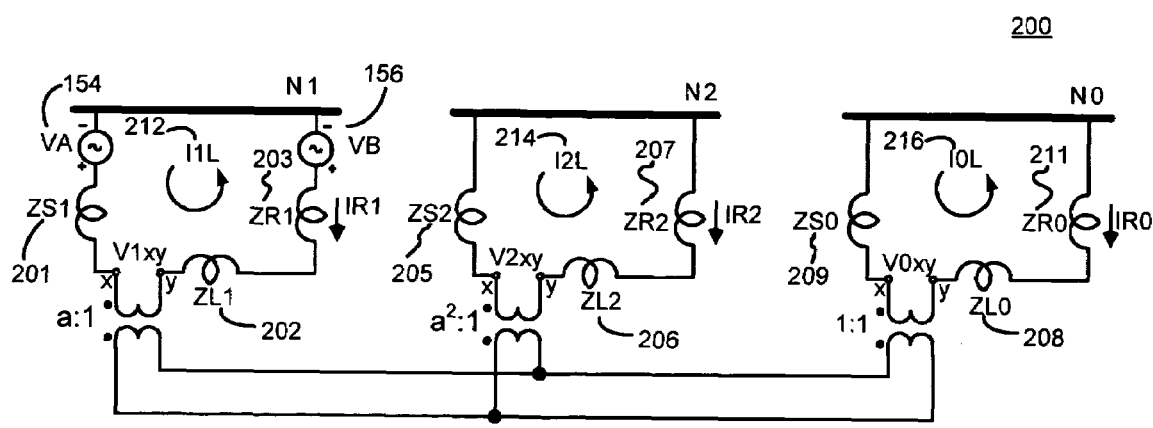
FIG. 7 is another sequence network diagram that may be used to resolve a B-phase pole open condition in the short transmission line of FIG. 5.

FIG. 7 is a sequence network diagram 200 that may be used to resolve a B-phase pole open condition occurring subsequent to a B-phase fault on the transmission line 152 (see also, FIG. 5). Referring to FIG. 7, in conjunction with FIG. 5, the positive-sequence node (N1) includes a left-side source positive-sequence impedance ZS1 201, a right-side source positive-sequence impedance ZR1 203, and a line positive-sequence impedance ZL1 202. Similarly, the negative-sequence node (N2) includes a left-side source negative-sequence impedance ZS2 205, a right-side source negative-sequence impedance ZR2 207, and a line negative-sequence impedance ZL2 206. The zero-sequence node (N0) includes a left-side source zero-sequence impedance ZS0 209, a right-side source zero-sequence impedance ZR0 211 and a line zero-sequence impedance ZL0 208.

As noted above, it is assumed that only that a B-phase pole is open (i.e., the pre-fault condition), followed by calculations that include the addition of an A-phase-to-ground fault while the B-phase pole remains open. It is also assumed that the B-phase pole is open between two points, x and y. Thus, the sequence voltages $V_{1_{xy}}$, $V_{2_{xy}}$, $V_{0_{xy}}$ between x and y may be expressed as:

$$\begin{pmatrix} V1_{xy} \\ V2_{xy} \\ V0_{xy} \end{pmatrix} = \frac{1}{3} \cdot \begin{pmatrix} 1 & a & a^2 \\ 1 & a^2 & a \\ 1 & 1 & 1 \end{pmatrix} \cdot \begin{pmatrix} VA_{xy} \\ VB_{xy} \\ VC_{xy} \end{pmatrix} \quad (31)$$

As is known, the "a" used in the matrix of equation (31) represents the complex operator $1\angle 120°$. Because in the B-phase pole open situation, $VA_{xy}$ and $VC_{xy}$ are zero, then:

$$V1_{xy} = (1/3) a\, VB_{xy}$$

$$V2_{xy} = (1/3) a^2 VB_{xy}$$

$$V0_{xy} = (1/3)VB_{xy} \tag{32}$$

It is further assumed that the B-phase current is zero such that:

$$IB = a^2 I1L + a\, I2L + I0L = 0 \tag{33}$$

and that three ideal transformers of FIG. 7 implement the two voltage and one current constraints.

The sequence network diagram 200 of FIG. 7 may be used to resolve unknown positive-, negative- and zero-sequence currents I1L 212, I2L 214 and I0L 216, as follows:

$$\begin{pmatrix} ZL1+ZS1+ZR1 & 0 & 0 & a \\ 0 & ZL1+ZS1+ZR1 & 0 & a^2 \\ 0 & 0 & ZL0+ZS0+ZR0 & 1 \\ a^2 & a & 1 & 0 \end{pmatrix} \cdot \begin{pmatrix} I1L \\ I2L \\ I0L \\ (1/3)VB_{xy} \end{pmatrix} = \begin{pmatrix} VA-VB \\ 0 \\ 0 \\ 0 \end{pmatrix} \tag{34}$$

Using the following variables:

$$\Delta V = VA - VB$$

$$m = ZL1 + ZS1 + ZR1 = ZL2 + ZS2 + ZR2$$

$$n = ZL0 + ZS0 + ZR0$$

$$m_1 = -(1-d)ZL1 - ZR1$$

$$n_1 = -(1-d)ZL0 - ZR0$$

$$p = m + m_1 = d\, ZL1 + ZS1 = d\, ZL2 + ZS2$$

$$q = n + n_1 = d\, ZL0 + ZS0 = d\, ZL0 + ZS0 \tag{35}$$

in the Gaussian elimination process, the pre-fault sequence currents I1L$_{preflt}$, I2L$_{preflt}$, I0L$_{preflt}$ during the B-phase pole open condition may be expressed as:

$$I1L_{preflt} = -I1R_{preflt} = \frac{\Delta V(m+n)}{m(+2n)} \tag{36}$$

$$I2L_{preflt} = I2R_{preflt} = -\frac{a\Delta V n}{m(m+2n)} \tag{37}$$

$$I0L_{preflt} = -I0R_{preflt} = -\frac{a^2 \Delta V}{m+2n} \tag{38}$$

Following the same reasoning, the A-phase pre-fault current on the left-side during the B-phase pole open condition, denoted as IAL$_{preflt}$, may be computed as a sum of the three sequence currents I1L$_{preflt}$, I2L$_{preflt}$, I0L$_{preflt}$:

$$IAL_{preflt} = \frac{m\Delta V(1-a^2) + n\Delta V(1-a)}{m(m+2n)} \tag{39}$$

The A-phase pre-fault current on the right-side, denoted as IAR$_{preflt}$, is the opposite of IAL$_{preflt}$:

$$IAR_{preflt} = \frac{m\Delta V(1-a^2) + n\Delta V(1-a)}{m(m+2n)} \tag{40}$$

Figure 8:
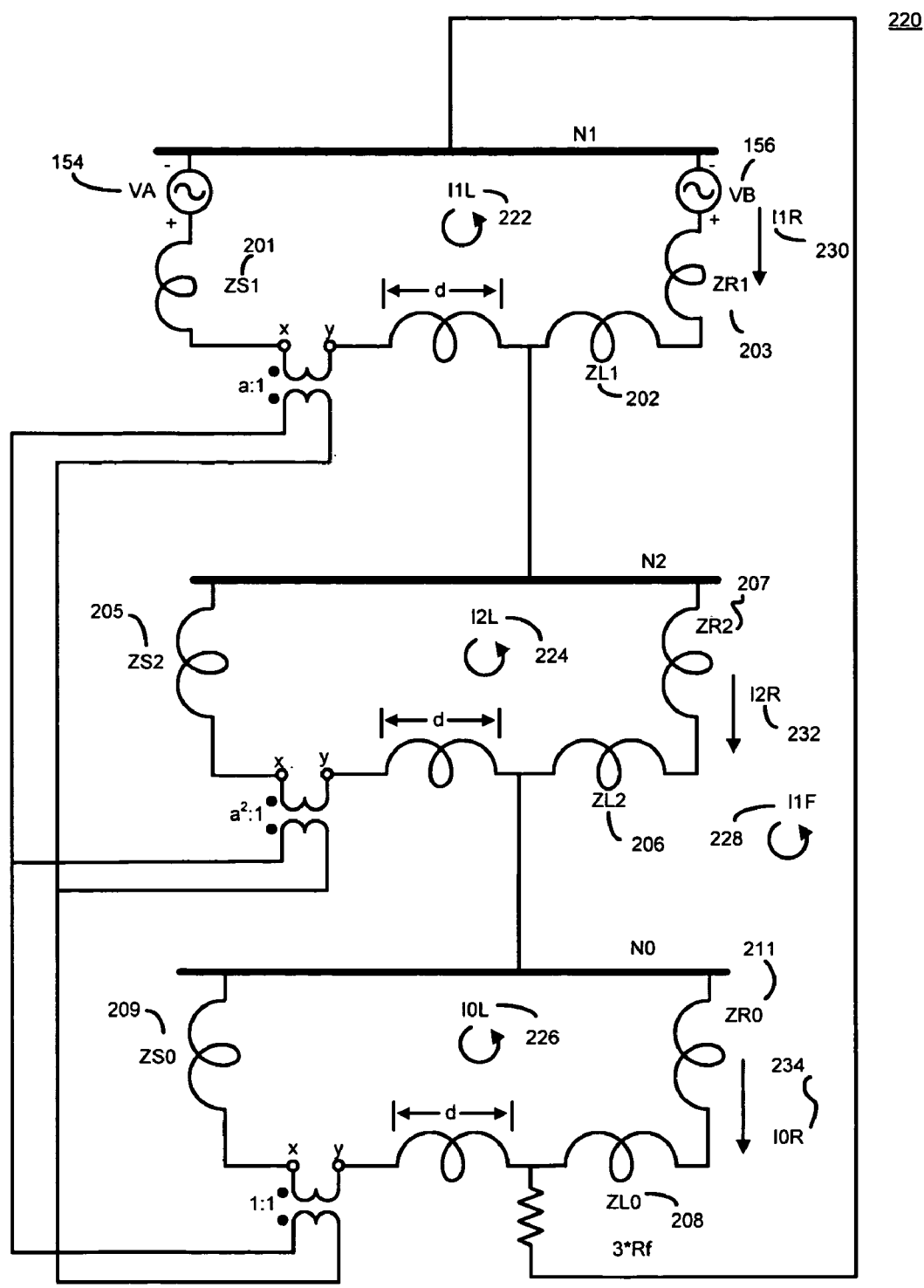
FIG. 8 is yet another sequence network diagram that may be used to resolve an A-phase-to-ground fault occurring during the B-phase pole open condition in the transmission line of FIG. 5.

Resolution of an Internal A-Phase-to-Ground Fault During a B-Phase Pole Open Condition—Fault Calculations The addition of the A-phase-to-ground fault to the B-phase pole open condition calculated above (i.e. the pre-fault condition) yields a new sequence network diagram. For example, FIG. 8 is yet another sequence network diagram 220 that may be used to resolve an A-phase-to-ground fault occurring during the B-phase pole open condition of the transmission line of FIG. 5. Referring to FIG. 8 in conjunction with FIG. 5, the positive-sequence node includes the left-side source positive-sequence impedance ZS1 201, the right-side source positive-sequence impedance ZR1 203 and the line positive-sequence impedance ZL1 202. Similarly, the negative-sequence node includes the left-side source negative-sequence impedance ZS2 205, the right-side source negative-sequence impedance ZR2 207 and the line negative-sequence impedance ZL2 206. The zero-sequence node includes the left-side source zero-sequence impedance ZS0 209, the right-side source zero-sequence impedance ZR0 211 and the line zero-sequence impedance ZL0 208.

As illustrated, the sequence network diagram 220 of FIG. 8 is equivalent to the sequence network diagram 200 of FIG. 7 with the addition of the A-phase-to-ground fault. after occurrence of the A-phase-to-ground fault, the new sequence currents I1L 222, I2L 224 and I0L 226 may be expressed as Equation (41) where:

$$\begin{pmatrix} ZL1+ZS1+ZR1 & 0 & 0 & -(1-d)ZL1-ZR1 & a \\ 0 & ZL2+ZS2+ZR2 & 0 & -(1-d)ZL2-ZR2 & a^2 \\ 0 & 0 & ZL0+ZS0+ZR0 & -(1-d)ZL0-ZR0 & 1 \\ ZS1+d\,ZL1 & ZS2+d\,ZL2 & ZS0+d\,ZL0 & 3R & 0 \\ a^2 & a & 1 & 0 & 0 \end{pmatrix} \begin{pmatrix} I1L \\ I2L \\ I0L \\ IF \\ (1/3)VB_{xy} \end{pmatrix} = \begin{pmatrix} \Delta V \\ 0 \\ 0 \\ VA \\ 0 \end{pmatrix}$$

Again, using the Gaussian elimination process, the pure fault positive sequence current I1F at the fault location (fault current 228) and the left-side sequence currents I1L 222, I2L 224 and I0L 226 after the A-phase-to-ground fault may be expressed as:

$$I1F = \frac{\Delta V p(1-a)(m+2n) + 2mVA(m+2n)}{2m(-0.5p-q)(m_1+2n_1) -} \quad (42)$$
$$-2a^2 m \Delta V(-0.5p-q) - $$
$$3pm_1(m+2n) + 6R_f m(m+2n)$$

$$I0L = \frac{-a^2 \Delta V}{m+2n} - \frac{m_1 + 2n_1}{m+2n} I1F \quad (43)$$

$$I2L = \frac{-a\Delta V n}{m(m+2n)} + \left(\frac{a^2}{2}\frac{m_1+2n_1}{m+2n} - \frac{m_1(1-a)}{2m}\right)I1F \quad (44)$$

$$I1L = \frac{\Delta V(m+n)}{m(m+2n)} + \left(\frac{a}{2}\frac{m_1+2n_1}{m+2n} + \frac{m_1(a^2-1)}{2m}\right)I1F \quad (45)$$

Following the same reasoning, the A-phase current on the left-side after the A-phase-to-ground fault, denoted as IAL, may be computed as a sum of the three left-side sequence currents I1L 222, I2L 224 and I0L 226 after the A-phase-to-ground fault:

$$IAL = \frac{\Delta V(m+n)}{m(m+2n)} + \frac{-a\Delta V n}{m(m+2n)} - \frac{a^2 \Delta V}{m+2n} + \quad (46)$$
$$\left(\left(\frac{a^2}{2} + \frac{a}{2} - 1\right)\left(\frac{m_1+2n_1}{m+2n}\right) + \frac{m_1(a^2-2+a)}{2m}\right)I1F$$

The right-side sequence currents I1R 230, I2R 232 and I0R 234 after the A-phase-to-ground fault may be expressed as:

$$I0R = \frac{a^2 \Delta V}{m+2n} + \frac{p+2q}{m+2n} I1F \quad (47)$$

$$I2R = \frac{a\Delta V n}{m(m+2n)} + \left(1 - \frac{a^2}{2}\frac{m_1+2n_1}{m+2n} + \frac{m_1(1-a)}{2m}\right)I1F \quad (48)$$

$$I1R = -\frac{\Delta V(m+n)}{m(m+2n)} + \left(1 - \frac{a}{2}\frac{m_1+2n_1}{m+2n} - \frac{m_1(a^2-1)}{2m}\right)I1F \quad (49)$$

Similarly, the right-side A-phase current after the A-phase-to-ground fault, denoted as IAR, is equal to the sum of the right-side sequence currents I1R 230, I2R 232 and I0R 234:

$$IAR = \frac{\Delta V(m+n)}{m(m+2n)} + \frac{a\Delta V n}{m(m+2n)} + \frac{a^2 \Delta V}{m+2n} + \quad (50)$$
$$\left(2 + \frac{p+2q - \left(\frac{a^2}{2}+\frac{a}{2}\right)(m_1+2n_1)}{m+2n} - \frac{m_1(a^2-2+a)}{2m}\right)I1F$$

Referring to equations (43)-(45) associated with the left bus 158 (see, FIG. 5), equations (47)-(49) associated with the right bus 160, and the pre-fault sequence current equations (36)-(38), the equations for the sequence currents at both extremities (i.e., the left and the right) include a first pre-fault term $$\left(\text{e.g., } I0L_{prefl} = \frac{-a^2 \Delta V}{m+2n}\right)$$

and a second term that is proportional to the pure fault positive sequence current I1F. Thus, by substituting equations 36-38 into equations 43-45 and 47-49, we note that for the right side and left side sequence currents we now have:

$$I0L = I0L_{prefl} - \frac{m_1+2n_1}{m+2n} I1F \quad (51)$$

$$I2L = I2L_{prefl} + \left(\frac{a^2}{2}\frac{m_1+2n_1}{m+2n} - \frac{m_1(1-a)}{2m}\right)I1F \quad (52)$$

$$I1L = I1L_{prefl} + \left(\frac{a}{2}\frac{m_1+2n_1}{m+2n} + \frac{m_1(a^2-1)}{2m}\right)I1F \quad (53)$$

$$I0R = I0R_{prefl} + \frac{p+2q}{m+2n} I1F \quad (54)$$

$$I2R = I2R_{prefl} + \left(1 - \frac{a^2}{2}\frac{m_1+2n_1}{m+2n} + \frac{m_1(1-a)}{2m}\right)I1F \quad (55)$$

$$I1R = I1R_{prefl} + \left(1 - \frac{a}{2}\frac{m_1+2n_1}{m+2n} - \frac{m_1(a^2-1)}{2m}\right)I1F \quad (56)$$

Similarly, the left- and right-side A-phase current equations (46) and (50) may be expressed as:

$$IAL = IAL_{prefl} - \frac{3}{2}\left(\frac{m_1+2n_1}{m+2n} + \frac{m_1}{m}\right)I1F \quad (57)$$

and:

$$IAL = IAL_{prefl} + \left(2 + \frac{p+2q - 0.5(m_1+2n_1)}{m+2n} + \frac{3m_1}{2m}\right)I1F \quad (58)$$

In view of sequence currents at both extremes (i.e., I0L, I2L, I1L, I0R, I2R, I1R) expressed in equations (51) through (56), the current I may be expressed in a general form corresponding to:

$$I = I_{prefl} + \text{func}(d, ZS1, ZL1, ZR1, ZS0, ZL0, ZR0)I1F \quad (59)$$

Accordingly, any current, either phase- or sequence-, may be expressed as the sum of the current existing before the fault, plus the product of a function "func" by the pure fault positive sequence current I1F flowing into the fault in its respective sequence network. Also, as illustrated above, the function "func" is a function of the fault location d 162 and network impedances only. Further, the pure fault positive sequence current I1F is a function of the fault location d 162, network impedances, the voltages generated by the first and second generators 154, 156 and the fault resistance $R_f$.

$$IF = \text{func}(d, ZS1, ZL1, ZR1, ZS0, ZL0, ZR0, Rf, VA, VB) \quad (60)$$

Thus, the current ratio of the A-phase element 111 (see, FIG. 3) during an A-to-ground fault under a B-phase pole open condition is provided as:

$$\frac{IAR}{IAL} = \frac{IAR_{preflt} + \left(2 + \frac{p + 2q - 0.5(m_1 + 2n_1)}{m + 2n} + \frac{3m_1}{2m}\right)I1F}{IAL_{preflt} - \frac{3}{2}\left(\frac{m_1 + 2n_1}{m + 2n} + \frac{m_1}{m}\right)I1F} \quad (61)$$

where the pure fault positive sequence current I1F is given as a function of the distance d to the fault, the network impedances and the two sources voltages.

Like the case of three pole-tripping schemes, equation (61) shows that the current ratio trajectory of the A-phase element 111 (see, FIG. 3) for a single pole-open condition is dependant upon the fault location d, the network impedances, the source voltages VA and VB, and the fault resistance $R_f$. As expected, for an A-phase-to-ground fault applied at a fault distance d of 33 percent from the left bus 158, during a B-phase pole-open condition, the A-phase element 111 becomes insensitive to the fault at a threshold fault resistance $R_f$.

Further, in contrast to the case of the three pole-tripping schemes where the zero-sequence element 114 and the negative-sequence element 115 are independent from the fault resistance $R_f$, during a B-phase pole-open condition and an A-phase to ground fault, both of the zero-sequence element 114 and the negative-sequence element 115 are dependant on the pure fault positive sequence I1F and consequently on the fault resistance $R_f$ and the source voltages as illustrated by equations (62) and (63):

$$\frac{I0L}{I0R} = \frac{\frac{-a^2 \Delta V}{m+2n} - \frac{m_1 + 2n_1}{m+2n}I1F}{\frac{a^2 \Delta V}{m+2n} + \frac{p+2q}{m+2n}I1F} \quad (62)$$

$$\frac{I2L}{I2R} = \frac{\frac{-a\Delta Vn}{m(m+2n)} + \left(\frac{a^2}{2}\frac{(m_1+2n_1)}{m+2n} + \frac{m_1(1-a)}{2m}\right)I1F}{\frac{a\Delta Vn}{m(m+2n)} + \left(1 - \frac{a^2}{2}\frac{m_1+2n_1}{m+2n} + \frac{m_1(1-a)}{2m}\right)I1F} \quad (63)$$

As a result, under conditions of a single pole-open and an occurrence of a single-phase-to-ground fault, the zero sequence element 114 and the negative sequence element 115 may become insensitive to the fault. When plotted on an alpha plane (see, FIG. 4), it can be shown that the zero-sequence current ratio trajectory $$\frac{I0L}{I0R}$$

of equation (62), with varying fault resistances, becomes insensitive to the A-phase-to-ground fault at a particular fault resistance threshold.

Figure 9:
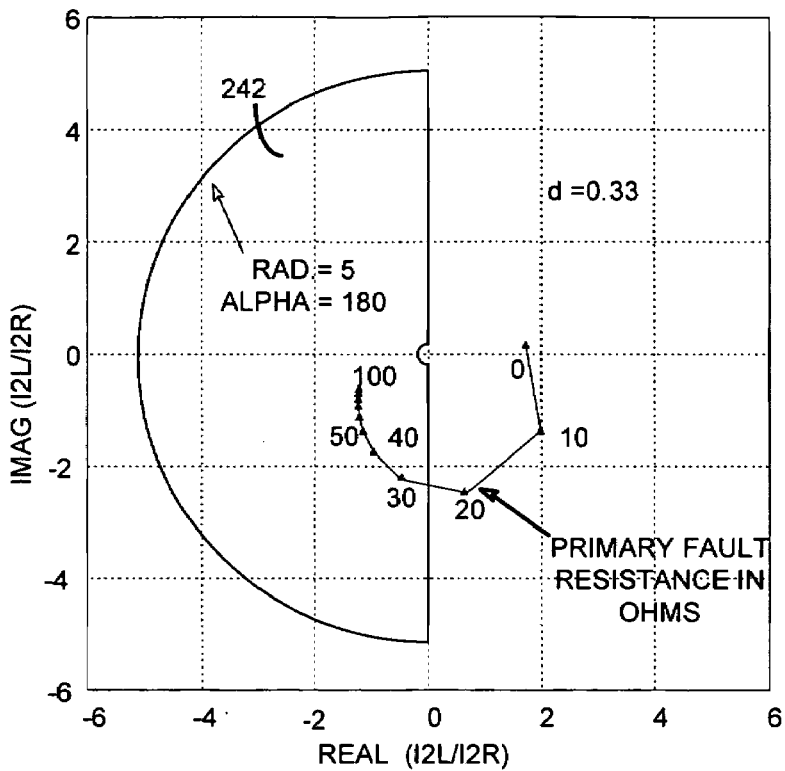
FIG. 9 is yet another alpha plane that may be used to plot the negative-sequence current ratio trajectories under the conditions of FIG. 8.

Similarly, when plotted on an alpha plane, it can be seen that the negative-sequence current ratio trajectory $$\frac{I2L}{I2R}$$

of equation (63), with varying fault resistances, becomes insensitive to the A-phase fault at a particular fault resistance threshold. For example, FIG. 9 is yet another alpha plane 260 that may be used to plot the negative-sequence current ratio trajectory of the transmission line of FIG. 5 under the conditions of FIG. 8. As illustrated in FIG. 9, the alpha plane 260 includes the stability area 242. For a fault distance d of 33 percent from the left bus 158, and for increasing fault resistances (i.e., 0 to 100 ohms in 10 ohm increments), the negative-sequence current ratio trajectory $$\frac{I2L}{I2R}$$

enters the stability area 242 at about 27 ohms. Thus, like the A-, B-, and C-phase elements 111-113, the negative-sequence element 115 loses it sensitivity at a particular fault resistance $R_f$ under conditions of an pole open and a concurrent phase-to-ground fault.

Summary of Equations (1) through (63)

In summary, as illustrated by a comparison of equations (21), (22) and (23) to equations (28) and (29), unlike the A-, B-, and C-phase elements 111-113 that do not operate properly at higher fault resistances during a single-phase-to-ground fault, neither of the zero-sequence and negative-sequence elements 114, 115 is dependant on the fault resistance $R_f$ and therefore can operate properly at higher fault resistances to detect any faults. As illustrated by equation (30) however, removal of the load current existing prior to the fault (see, equation (21)) removes the dependency of the A-, B-, and C-phase elements 111-113 on the fault resistance, thereby restoring their ability to operate properly at higher fault resistances. During a three-phase fault, the A-, B-, and C-phase elements 111 -113 operate properly to detect a fault while the zero-sequence and negative-sequence elements 114, 115 do not operate due to the "balanced" conditions.

Further, as illustrated by FIG. 9 and equations (62) and (63), under conditions of single pole-tripping applications with one phase open (e.g., a B-phase pole-open) and a concurrent single-phase-to-ground fault (e.g., an A-phase-to-ground fault), all of the A-, B-, and C-phase elements 111-113 and the zero- and negative-sequence elements 114, 115 are at risk of becoming insensitive to a fault at higher fault resistances $R_f$. Therefore, while not a common occurrence, a pole-open condition with a concurrent single-phase-to-ground fault may cause detrimental consequences to the power system 10 when the fault goes undetected.

Referring again to equations (32) through (40) and FIG. 5, during a B-phase pole-open condition, it should be noted that there are negative-sequence currents and zero-sequence currents flowing in the transmission line 152. Accordingly, the zero-sequence element 114 and the negative-sequence element 115 respectively process the negative-sequence currents and zero-sequence currents flowing in the transmission line 152 as if they resulted from an external fault. Consequently, either the zero-sequence element 114 and/or the negative-sequence element 115 may not pick-up, or operate, even during an occurrence of a fault. Again, detrimental consequences may result to the power system 10 if the fault goes undetected.

As described below in multiple embodiments of the invention, when each of the pre-fault sequence currents calculated during the B-phase pole open condition, $I2L_{preflt}$, $I0L_{preflt}$, $I2R_{preflt}$, $I0R_{preflt}$, (see, equations (36) through (38)) is removed from corresponding zero-sequence current ratio calculations I0L/I0R and corresponding negative-sequence current ratio calculations I2L/I2R, the ratios become independent of the current flowing into the fault and consequently, independent from the fault resistance $R_f$ and the two sources voltages as illustrated by equations (64) and (65). Accordingly, during any single-pole open condition with a concurrent single-phase-to-ground fault, the zero-sequence element 114 and the negative-sequence element 115 will pick-up, or properly operate, for any fault resistance values.

$$\frac{I0L - I0L_{preflt}}{I0R - I0R_{preflt}} = \frac{-\frac{m_1 + 2n_1}{m + 2n} I1F}{\frac{p + 2q}{m + 2n} I1F} = \frac{-(m_1 + 2n_1)}{p + 2q} \quad (64)$$

$$\frac{I2L - I2L_{preflt}}{I2R - I2R_{preflt}} = \frac{\frac{a^2}{2} \frac{m_1 + 2n_1}{m + 2n} - \frac{m_1(1-a)}{2m}}{1 - \frac{a^2}{2} \frac{m_1 + 2n_1}{m + 2n} + \frac{m_1(1-a)}{2m}} \quad (65)$$

The zero- and negative-sequence current ratios that include removal of their corresponding pre-fault sequence currents are referred to herein as "compensated" sequence current ratios. Thus, equation (64) represents a compensated zero-sequence current ratio formed from the compensated local and remote zero-sequence current, and equation (65) represents a compensated negative-sequence current ratio formed from the compensated local and remote negative-sequence current.

Figure 10:
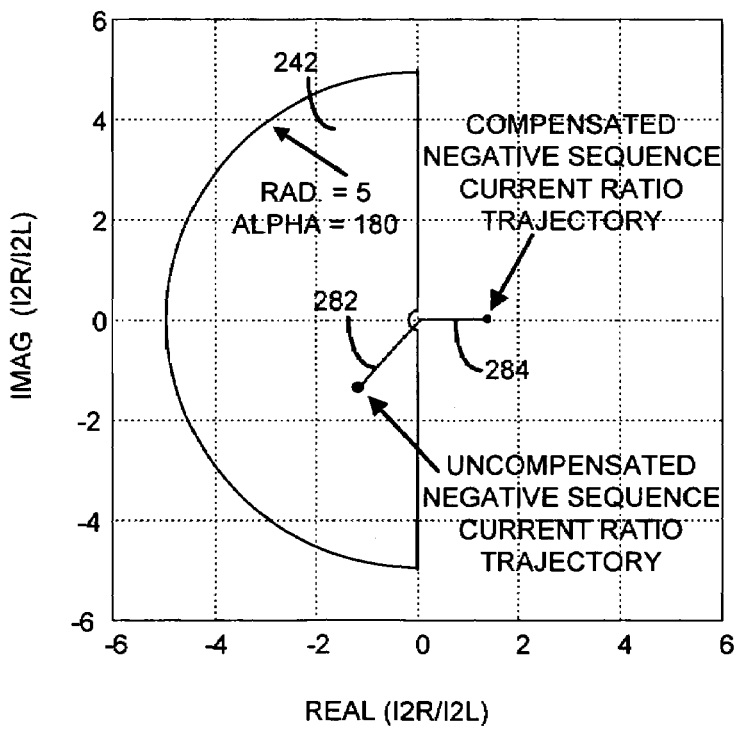
FIG. 10 is yet a further alpha plane illustrating the compensated negative-sequence current ratio trajectories verses the un-compensated compensated negative-sequence current ratio trajectories, according to an embodiment of the invention.

FIG. 10 is yet a further alpha plane 280 illustrating the compensated vs. non-compensated negative-sequence current ratio trajectories during a single-pole open condition and concurrent single-phase-to-ground fault, according to an embodiment of the invention. As illustrated in FIG. 10, despite the occurrence of the A-phase-to-ground fault, a first trajectory 282 representative of the non-compensated negative-sequence current ratio falls within the stability area 242. Accordingly, the A-phase-to-ground fault remains undetected by the negative-sequence current element 115; the negative-sequence current element 115 is insensitive to the fault.

Conversely, a second trajectory 284, representative of the compensated negative-sequence current ratio where the pre-fault sequence current is removed, does not fall within the stability area 242. Rather, it falls in the trip area. Accordingly, the A-phase-to-ground fault is detected by the negative-sequence current element 115 during the pole open condition; the negative-sequence current element 115 is sensitive to the fault and operates properly. Thus, as shown above, removal of the pre-fault sequence currents during a phase-to-ground fault with a concurrent pole-open condition renders both of the negative-sequence element 115 and the zero-sequence element 114 independent of the fault resistance $R_f$ and therefore restores their sensitivity to properly detect faults.

Impact of Transmission Line Length on the Pickup Settings for the Phase and Sequence Elements Referring again to FIG. 1 and FIG. 3, in addition to a load current component, a long transmission line typically includes a shunt or charging current component. Thus, unlike the short transmission line of FIG. 5, at the extremities of a long transmission line, each of the A-, B- and C-phase currents will include a shunt component representing the current drawn by the shunt capacitance, and a load current component representing the current flowing in the transmission line. Because at a low load, corresponding local and remote shunt currents will have a phase difference close to zero degrees, each of the local and remote shunt currents is perceived by the A-phase element 111, the B-phase element 112 and the C-phase element 113 as an internal fault. Thus, the pickup current setting for each of the A-phase element 111, the B-phase element 112 and the C-phase element 113 is preferably selected to be equal to a value that is twice the maximum shunt current to avoid erroneous relay operation.

For the zero-sequence element 114 and the negative-sequence element 115, under conditions of three-pole tripping practice, the shunt components of the A-phase, B-phase and C-phase currents are balanced, yielding an almost zero negative-sequence and zero-sequence current and rendering the impact of shunt currents on the zero-sequence element 114 and the negative-sequence element 115 negligible. Under conditions of a single-pole tripping practice however, the shunt components of the A-phase, B-phase and C-phase currents are unbalanced. As a result, the shunt components are seen by the zero-sequence and the negative-sequence elements 114, 115 as an internal fault. Thus, the pickup current setting for each of the zero-sequence and the negative-sequence elements 114, 115 is preferably equal to twice the maximum phase shunt current (where the zero-sequence and the negative-sequence shunt current at each extremity is equal to one-third of the magnitude of each shunt phase current).

Figure 11:
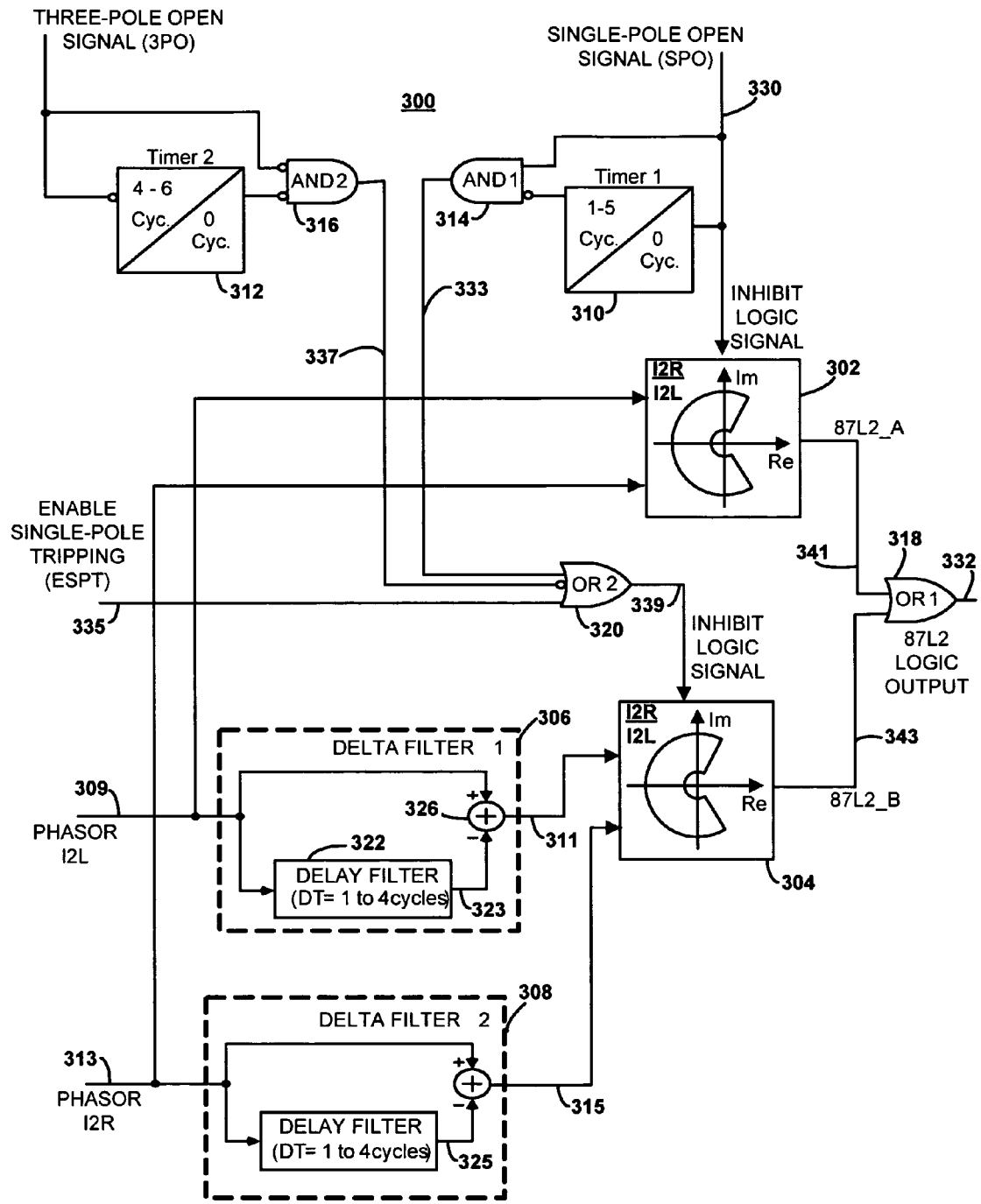
FIG. 11 is an exemplary logic circuit diagram for compensating the sensitivity of a negative-sequence element scheme of the local line current differential relay of FIG. 1, according to an embodiment of the invention.

Implementing Removal of the Pre-Fault Current from the Current Ratios Utilized by the Sequence Elements Implementing removal of the pre-fault sequence current may be accomplished in one of any number of ways. For example, FIG. 11 is an exemplary logic circuit diagram 300 for compensating the sensitivity of a negative-sequence element scheme of the local line current differential relay 50, according to an embodiment of the invention. The remote line current differential relay 52 may be identically configured and operable. Although illustrated using the negative-sequence element 115, it should be understood that the logic of FIG. 11 is equally applicable to the zero-sequence element 114 as well as to all three phase elements 111, 112 and 113 of the local line current differential relay 50. Further, the logic of FIG. 11 is also applicable to phase and sequence elements of other suitable protective relays.

FIG. 11 shows first and second negative-sequence elements 302, 304, similarly configured and operable as described in connection with FIGS. 3 and 4. Unlike FIG. 3 however where only one negative-sequence element is included in the relay logic, inclusion of the second negative-sequence element 304 enables the local differential relay 50 to respond to additional power system conditions. As described below, the first negative-sequence element 302 utilizes conventional phasor inputs while the second negative-sequence element 304 utilizes compensated inputs.

Also included are first and second delta filters 306 and 308. The first delta filter 306 includes a first phasor input configured to receive a local negative-sequence current phasor 309 I2L, and a first output configured to provide a local delta filter output signal 311, in this case a compensated local negative sequence current phasor, to the second negative-sequence element 304. Similarly, the second delta filter 308 includes a second phasor input configured to receive a remote negative-sequence current phasor 313 I2R, and a second output configured to provide a remote delta filter output signal 315, in this case a compensated remote negative-sequence current phasor, to the second negative-sequence element 304.

Logic circuit diagram 300 also includes first and second timers 310 and 312, first and second AND-gates 314 and 316, and first and second OR-gates 318 and 320. In general, such timers are used to delay issuance of a trip signal to an associated breaker in the event of a fault where a magnitude of digitized current signal (representative of a measured secondary current) is greater than or equal to a predetermined pickup value. More specifically, in addition to being used to delay issuance of a trip signal, under certain conditions the first and second timers 310, 312 are independently used to delay operation of the first and second negative sequence elements 302, 304.

For example, when enabled via an occurrence of a single pole-open condition (occurring subsequent to the clearing of a phase-to-ground fault), the first timer 310 prevents the second negative-sequence element 304 from operating for a number of power cycles, for example, four power cycles. This delay provides the time necessary to ensure that constant shunt current present in the protected line is removed from the local and remote delta filter output signals 311, 315 received by the second negative-sequence element 304. While described as preferably having a four power cycle time-out period, it is contemplated that the first and second timers 310 and 312 may have other time-out periods, such as five power cycles or three power cycles, depending on the parameter settings of the associated protective relay.

Similarly, when the poles are closed upon conclusion of a three-phase pole-open condition (e.g., the conclusion of a maintenance event or an automatic reclosing), a binary low value at the inverting input of the second timer 312 initiates a second timer countdown. During the second timer countdown, a binary high value for the second AND-gate output signal 337 temporarily prevents the second negative-sequence element 304 from operating for a number of power cycles of the second timer countdown, for example, five power cycles. Upon expiration of the second timer 312, operation of the second negative-sequence element 304 resumes.

The first AND-gate 314 includes one inverting input configured to receive a first timer output, one non-inverting input configured to receive a first inhibit logic signal 330 upon an occurrence of a single pole-open condition and an output configured to provide a first AND-gate output signal 333 to the second OR-gate 320. The second AND-gate 316 includes two inverting inputs, one configured to receive a second timer output signal and one configured to receive a three open-pole logic signal, and an output configured to provide a second AND-gate output signal 337 to the second OR-gate 320. The first OR-gate 318 includes an input configured to receive an 87L2_A output signal, or a first negative-sequence element output signal 341, and an input configured to receive an 87L2_B output signal, or a second negative-sequence element output signal 343. The first OR-gate also includes an output configured to provide an 87L2 output signal, or a final negative-sequence output signal 332. A binary logic high value for the final negative-sequence output signal 332 indicates a trip condition (e.g., one of the negative-sequence current ratios I2R/I2L has a trajectory in the trip area of the associated alpha plane), while a binary logic low value for the final negative-sequence output signal 332 indicates no trip condition (e.g., both of the negative-sequence current ratios I2R/I2L have a trajectory in the stability area of the associated alpha plane).

As mathematically explained above, removal of the pre-fault sequence currents during a phase-to-ground fault occurring during a concurrent pole-open condition renders operation of the associated sequence element independent from the fault resistance $R_f$ and therefore restores the sensitivity of the associated element. One of a number of suitable schemes to remove pre-fault sequence currents, inclusion of the first and second delta filters 306 and 308 enables removal of the pre-fault negative sequence current from the negative-sequence current ratio I2R/I2L, according to an embodiment of the invention.

Figure 12:
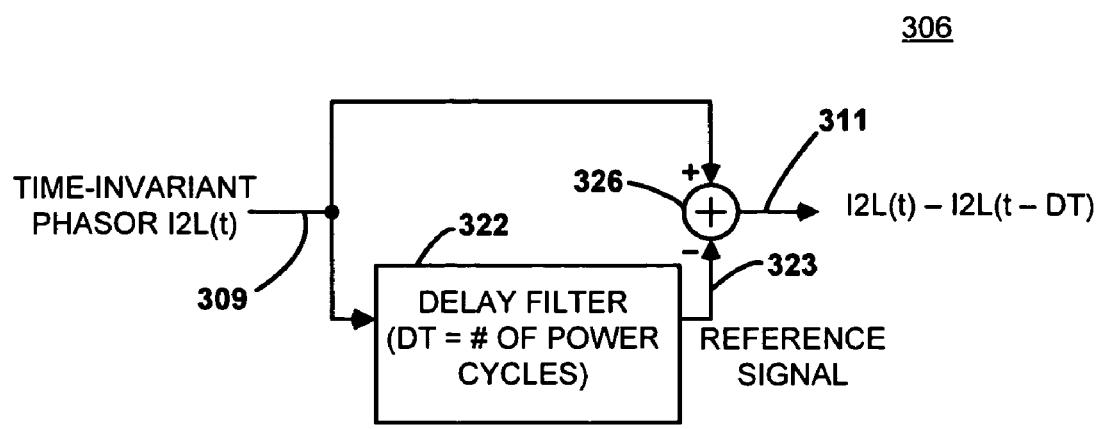
FIG. 12 is a more detailed diagram of a delta filter of the logic circuit of FIG. 11.

FIG. 12 is a more detailed diagram of the first delta filter 306. The second delta filter 308 is identically configured and operable to the first delta filter 306. Referring to FIG. 12, the first delta filter 306 includes a delay filter 322 and an adder 326. The delay filter 322 includes an input to receive a time-invariant form of the local negative-sequence current phasor 309 I2L. An output of the delay filter 322 provides a local reference signal 323 to an adder 326. The local reference signal 323 is a delayed phasor provided by the delay filter 322 as a delayed version of the local negative-sequence current phasor 309 I2L. The delay is equal to a predetermined number of power cycles determined by a delay timer interval DT. For example, if the delay time interval is two, then two power cycles after it is received by the delay filter 322, the local negative-sequence current phasor is provided to the adder 326 as the local reference signal 323.

When received by the adder 326, the local reference signal 323 is subtracted from the local negative-sequence current phasor 309 I2L to form the local delta filter output signal 311. Accordingly, the local delta filter output signal 311 is equal to the time-invariant form of the local negative-sequence current phasor 309 I2L minus the same time-invariant form of the local negative-sequence current phasor I2L, delayed by the delay time interval DT. Thus, upon a phase-to-ground fault, the local delta filter output 311 is equal to the negative-sequence current minus the negative sequence pre-fault current, but only during the subsequent delay time interval DT. It should be noted that although some operational aspects of the delta filter 306 are included herein, a more detailed description of the delta filter is provided by U.S. Pat. No. 6,417,791, entitled "Delta Filter with an Adaptive Time Window for Protective Relays", issued on Jul. 9, 2002, to Benmouyal et al., the contents of which are hereby incorporated by reference.

Referring again to FIG. 11, operation of each of the first and second negative-sequence elements 302 and 304 is determined by the conditions and configuration of the power system 10. In general, both of the first and second negative-sequence elements 302, 304 operate simultaneously. It should be noted however, that when no poles are open and no fault is occurring, the power system 10 is "balanced". As a result, each of the local and remote delta filter output signals 311, 315 is almost zero, yielding a binary logic low value for the second negative-sequence element output signal 343. Other operation conditions of the logic of FIG. 11 include:

When not enabled in the relay by way of an operator-entered setting, an enable single-pole tripping signal 335 prevents operation of the second negative-sequence element 304 via a binary logic high value for the second inhibit logic signal 339 provided by the second OR-gate 320.

During normal power system operation with the enable single-pole tripping signal 335 enabled, both the first and second negative-sequence elements 302 and 304 operate simultaneously.

When no single-pole open condition is detected, neither of the first nor second inhibit logic signals 330, 339 is enabled and consequently both of the first and second negative-sequence elements 302 and 304 are allowed to operate. Upon conclusion of the three pole-open condition (i.e., closing of the transmission line) however, a binary logic high value for the second AND-gate output signal 337 temporarily prevents operation of the second negative-sequence element 304 for a number power cycles determined by the second timer 316. In other words, upon conclusion of the three pole-open condition, the second inhibit logic signal 339 has the binary logic high value for the predetermined number of power cycles. During that time however, the first negative-sequence element 302 continues to operate.

Upon an occurrence of a single-phase pole-open condition, the first inhibit logic signal 330 has the binary logic high value as long as the single-phase pole-open condition persists; the first negative-sequence element 302 is disabled. Concurrently, the second negative-sequence element 304 is temporarily disabled for a number of power cycles determined by the first timer 310. Upon expiration of the first timer 310, operation of the second negative-sequence element 302 resumes. As will be described below, temporary disabling of the second negative-sequence element 304 enables shunt current components to be removed from the local and remote delta filter output signals 311, 315 utilized by the second negative-sequence element 304.

More specifically, referring to the first negative-sequence element 302, during normal operation, when the first inhibit logic signal 330 is, for example, a binary low value (e.g., a logic 0), indicating the absence of a pole-open condition on the monitored line, the first negative-sequence element 302 utilizes the local negative-sequence current phasor I2L 309 and the remote negative-sequence current phasor I2R 313 to determine the (binary) value of first negative-sequence element output signal 341 as described in connection with FIG. 3. If the first negative-sequence element output signal 341 has a binary low value, then the trajectory of the corresponding negative-sequence current ratio I2R/I2L is in the stability area of the alpha plane, indicating that no internal fault exists in the monitored single-phase line. If the first negative-sequence element output signal 341 has a binary high value, then the trajectory of the corresponding negative-sequence current ratio I2R/I2L is in the trip area of the alpha plane, indicating that an internal fault does exist in the monitored line.

Although continuously receiving the local and remote delta filter output signal 311, 315, operation of the second negative-sequence element 304 is "transparent" in the absence of a pole-open condition on the monitored line, as the second negative-sequence element output signal 343 is a binary low signal. When a single pole-open condition is detected however, a binary high value of the first inhibit logic signal 330 inhibits/blocks operation of the first element 302 during the time period of the single pole-open condition. In addition, for a number of power cycles determined by the first timer 310, a binary high value of the first AND-gate output signal 333 and consequently the second inhibit logic signal 339 temporarily prevents the second negative-sequence element 304 from operating. Upon expiration of the first timer 310, a binary low value of the first AND-gate output signal 333 and the second inhibit logic signal 339 enable resumption of second negative-sequence element operation.

Temporarily inhibiting operation of the second negative-sequence element 304 for a period of a few power cycles provides the time necessary to remove any undesirable shunt current effects appearing in the local and remote delta filter output signal 311, 315. As discussed above, such shunt current components are included in the local and remote negative-sequence current phasors 309, 313 (and the zero-sequence currents) upon an occurrence of the single open-pole condition as the power system 10 transitions from a balanced state to an "unbalanced" state.

As described in connection with FIG. 12, the local reference signal 323 is equivalent to the local negative-sequence current phasor 309 delayed by the delay time interval DT. Although the time delay interval DT is preferably less than the countdown period of both the first and second timers 310 and 312, it is contemplated that the time delay interval DT may be equal to the countdown period of one or more of the first and second timers 310 and 312.

Implementation of pre-fault sequence current removal via use of the delta filter has a limitation. That is, upon a phase-to-ground fault, the local and remote delta filter output signals 311, 315 provide the compensated negative-sequence current for only the time period of the delay time interval DT; in the instant case, for the two power cycles of the time delay interval DT. This limitation is the result of a constantly changing local and remote reference signal 323, 325.

For example, referring again to FIG.12, assuming a delta filter delay of 2 cycles, upon an occurrence of a fault at t=0, the local delta filter output signal 311 is equal to the fault local negative-sequence current phasor occurring at t=0 minus the local negative-sequence current phasor existing two power cycles before the fault (i.e., t=−2). Similarly, at t=1, the local delta filter output signal 311 is equal to the fault local negative-sequence current phasor occurring at t=1 minus the local negative-sequence current phasor existing one power cycle before the fault (i.e., t=−1). During the time period occurring between t=0 and t=2 power cycles, the local delta filter output signal 311 remains equal to the fault sequence current phasor minus the sequence current phasor existing before the fault occurrence. At t=2 power cycles however, the local delta filter output signal 311 becomes zero because two power cycles after t=0, the local delta filter output signal 311 equals the fault sequence current phasor 309 minus the same fault sequence current 323. Accordingly, upon an occurrence of a fault, the local delta filter output signal 311 will be equal to the fault negative- (or zero-) sequence current phasor minus the pre-fault negative- (or zero-) sequence current phasor; but only for a time interval equal to the delay time interval DT.

Figure 13:
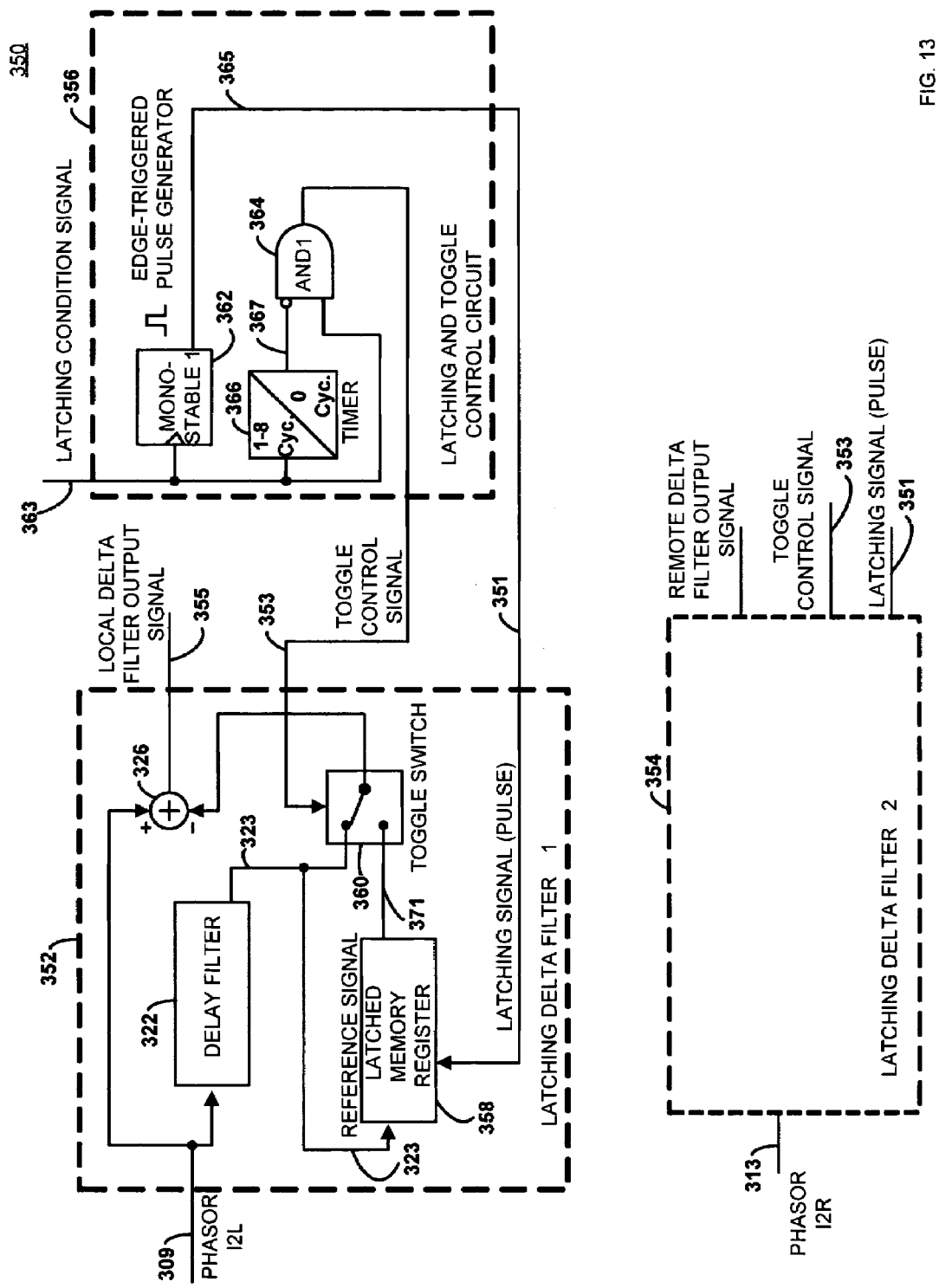
FIG. 13 is a latching delta filter system that may be used the logic circuit of FIG. 11 to maintain the local and remote reference signal for a time period longer than the delay time interval.

In some cases, it may be desirable prevent the limitation resulting from the delay time interval DT and instead maintain the local and remote reference signals 323, 325 that reflected the pre-fault negative sequence current just prior to an occurrence of the fault for a time period longer than the delay time interval DT. FIG. 13 is a latching delta filter system 350 that may be used to maintain the local and remote reference signal 323, 325 for a time period longer than the delay time interval DT.

Referring to FIG. 13, the latching filter system 350 includes a local latching delta filter 352 and a remote latching filter 354 operatively coupled to a latching and toggle control circuit 356. Although only the local latching delta filter 352 is shown is shown in detail, it should be understood that the remote latching delta filter 354 is configured and operable as described in connection with the local latching delta filter 352.

The local latching delta filter 352 includes a first input configured to receive the local negative-sequence current phasor 309, a second input configured to receive a latching signal 351, a third input configured to receive a toggle control signal 353, and a output configured to provide local latching delta filter output signal 355 to the second negative-sequence element 304. The local latching delta filter 352 also includes the delay filter 322, the adder 326, a latched memory register 358, and a toggle switch 360 operatively coupled to the delay filter 320, the adder 326 and the latched memory register 358. The latched memory register 358 includes an input for receiving the local reference signal 323, and an output configured to provide a latched local reference signal 371.

In general, upon an occurrence of a fault, the local reference signal 323 associated with the fault (i.e., the reference signal that reflected the current just prior to the occurrence of the fault) is latched into the latched memory register 358 via receipt of the latching signal 351. As a result, the latched local reference signal 323 is constant and non-changing and can be used over a time interval beyond the delay time interval DT, thus extending the fault detection interval during an open pole condition. In addition, due to the extended fault detection interval, the delay time interval DT of the delay filter 320 may be reduced to one power cycle.

The latching and toggle control circuit 356 includes a rising-edge triggered mono-stable pulse generator, or pulse generator 362, having an input configured to receive a latching condition signal 363 and an output configured to provide an edge-triggered pulse 365 to the latched memory register 358 when the latching condition signal 363 has a binary high value. Also included is a control timer 366 having an input configured to receive the latching condition signal 363, and toggle control AND-gate 364 having a first input configured to receive the latching condition signal 363, a second inverting input configured to receive a control timer output signal 367, and an output configured to provide a toggle control signal 353 to the toggle switch 360.

During operation of the local latching delta filter 352 when no fault is detected, the toggle switch 360 is configured in a first position to route the local reference signal 323 directly to the adder 326 for operation as described above in connection with FIGS. 11 and 12. Upon detection of a fault condition, the latching condition signal 363 transitions from a binary low value to a binary high value. In response, a latching signal 351 provided by the pulse generator 362 causes the current local reference signal 323 to be latched into the latched memory register 358. The binary high value for the latching condition signal 363 also initiates a countdown timer period of the control timer 366. The value of time period of countdown is pre-selected and may therefore be one of any number of countdown timer periods (e.g., five power cycles). During the countdown timer period a binary high value of the toggle control signal 353 causes the toggle switch 360 to be configured in a second position such that the latched local reference signal 371 is provided to the adder 326. Upon expiration of the countdown time period, the toggle control signal 353 transitions to a binary low value and the toggle switch 360 reverts back to its first position. As a result, the latched local reference signal 371 is provided for use local negative-sequence element 115 for a time period equivalent to the toggle switch countdown timer period rather than for the shorter the delay time interval DT provided by the delay filter 322.

As may be apparent from the foregoing discussion and accompanying figures, a system, an apparatus and a method disclosed herein enables current differential protection during a single-phase pole-open condition via compensating, or adjusting the sensitivity of, the negative- and zero-sequence elements of the protective device in order to ensure their proper operation during a phase-to-ground fault with a high fault resistance. The compensation is accomplished via the removal of pre-fault currents from the post-fault currents utilized by the negative- and zero-sequence elements to provided the differential protection.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. An apparatus for compensating the sensitivity of a line current differential element of a first current differential relay providing differential protection for a transmission line of a power system during a single-phase pole-open condition, the apparatus comprising:
   a first delta filter configured to remove a first pre-fault current from a first fault current of the transmission line to form a compensated first current;
   a second delta filter configured to remove a second pre-fault current from a second fault current of the transmission line to form a compensated second current, each of a first phasor representative of the compensated first current and a second phasor representative of the compensated second current provided to the line current differential element to compensate the sensitivity of the line current differential element; and,
   a circuit for interrupting operation of the first line current differential element upon detecting the single-phase pole-open condition.

2. The apparatus of claim 1, wherein the line current differential element is configured to calculate a compensated phasor ratio of the first and second phasors, and compare the compensated phasor ratio to a stability area of an alpha plane of the line current differential element to provide the differential protection.

3. The apparatus of claim 1, wherein the circuit for interrupting comprises a countdown timer configured to interrupt operation of the first line current differential element by a countdown time period of a number of power cycles of the power system upon detecting the single-phase pole-open condition.

4. The apparatus of claim 1, wherein the first current differential relay is operatively coupled to a first end of the transmission line and in communication with a second current differential relay operatively coupled to a second end of the transmission line.

5. The apparatus of claim 4, wherein the first current differential relay is further configured to:
   derive a first pre-fault current phasor from instantaneous values of the first pre-fault current measured by the first current differential relay and derive a first fault current phasor from instantaneous values of the first fault current measured by the first current differential relay, subtraction of the first pre-fault current phasor from the first fault current phasor forming the first phasor, and
   derive a second pre-fault current phasor from instantaneous values of the second pre-fault current measured by and received from the second current differential relay and derive a second fault current phasor from instantaneous values of the second fault current measured by and received from the second current differential relay, subtraction of the second pre-fault current phasor from the second fault current phasor forming the second phasor.

6. The apparatus of claim 1, wherein the line current differential element is selected from the group consisting of a zero-sequence current element and a negative-sequence current element.

7. The apparatus of claim 1, wherein the line current differential element is selected from the group consisting of an A-phase current element, a B-phase current element and a C-phase current element.

8. A method for compensating the sensitivity of a line current differential element of a first current differential relay providing differential protection for a transmission line of a power system during a single-phase pole-open condition, the method comprising:
- (a) removing a first pre-fault current from a first fault current of the transmission line to form a compensated first current;
- (b) removing a second pre-fault current from a second fault current of the transmission line to form a compensated second current; and
- (c) providing a first phasor representative of the compensated first current and a second phasor representative of the second compensated current to the line current differential element to compensate the sensitivity of the line current differential; and,
- (d) calculating a compensated phasor ratio of the first phasor and the second phasor upon conclusion of an interrupt resulting from detection of the single-phase pole-open condition.

9. The method of claim 8, further comprising comparing the compensated phasor ratio to a stability area of an alpha plane of the line current differential element to provide the differential protection.

10. The method of claim 8, wherein the interrupt comprises a countdown period of a number of power cycles of the power system beginning upon detection of the single-phase pole-open condition.

11. The method of claim 8, wherein the first current differential relay is operatively coupled to a first end of the transmission line and in communication with a second current differential relay operatively coupled to a second end of the transmission line.

12. The method of claim 11, further comprising:
deriving a first pre-fault current phasor from instantaneous values of the first pre-fault current measured by the first current differential relay and deriving a first fault current phasor from instantaneous values of the first fault current measured by the first current differential relay, subtraction of the first pre-fault current phasor from the first fault current phasor forming the first phasor; and
deriving a second pre-fault current phasor from instantaneous values of the second pre-fault current measured by and received from the second current differential relay and deriving a second fault current phasor from instantaneous values of the second fault current measured by and received from the second current differential relay, subtraction of the second pre-fault current phasor from the second fault current phasor forming the second phasor.

13. The method of claim 8, wherein the line current differential element is selected from the group consisting of a zero-sequence current element and a negative-sequence current element.

14. The method of claim 8, wherein the line current differential element is selected from the group consisting of an A-phase current element, a B-phase current element and a C-phase current element.

15. A system for compensating the sensitivity of a first line current differential sequence element of a local current differential relay, the local current differential relay operatively coupled to a first end of a transmission line of a power system and in communication with a remote current differential relay operatively coupled to a second end of the transmission line, the system comprising:
a first delta filter operatively coupled to the first line current differential sequence element, the first delta filter comprising a first delay filter configured to receive a first local sequence current phasor at a first time and to generate a first delayed local sequence current phasor at a second time, and a first adder configured to subtract the first delayed local sequence current phasor from a second local sequence current phasor received at the second time to form a compensated local sequence current phasor; and
a second delta filter operatively coupled to the first line current differential sequence element, the first second filter comprising a second delay filter configured to receive a first remote sequence current phasor at the first time and to generate a first delayed remote sequence current phasor at the second time, and a second adder configured to subtract the first delayed remote sequence current phasor from a second remote sequence current phasor received at the second time to form a compensated remote sequence current phasor,
wherein the first line current differential element is configured to receive each of the compensated local and remote sequence current phasors to compensate the sensitivity of the first line current differential element upon conclusion of a timer configured to interrupt operation of the first line current differential element upon detecting the single-phase pole-open condition of the transmission line.

16. The system of claim 15, wherein the timer is a first countdown timer configured to interrupt operation of the first line current differential sequence element by a first predetermined number of power cycles of the power system upon detecting a single-phase pole-open condition of the transmission line.

17. The system of claim 16, wherein upon expiration of the first countdown timer, the first line current differential sequence element is configured to calculate a compensated phasor ratio of the compensated local and remote sequence current phasors, and compare the compensated phasor ratio to a stability area of an alpha plane to provide differential protection of the transmission line.

18. The system of claim 16, further comprising a second line current differential sequence element operable prior to detecting the single-phase pole-open condition, the second line current differential sequence element configured to calculate a phasor ratio of at least the first local and remote sequence current phasors, and compare the phasor ratio to the stability area to provide differential protection of the transmission line.

19. The system of claim 16, further comprising a second countdown timer configured to delay operation of the first line current differential sequence element by a second predetermined number of power cycles upon detecting cessation of a three-phase pole-open condition of the transmission line.

20. The system of claim 15, wherein the first line current differential sequence element comprises a zero-sequence current element.

21. The system of claim 15, wherein the first line current differential sequence element comprises a negative-sequence current element.

22. An apparatus for compensating the sensitivity of at least one line current differential sequence element of a local current differential relay during a single-phase pole-open condition of a transmission line of a power system, the local current differential relay operatively coupled to a first end of the transmission line and in communication with a remote current differential relay operatively coupled to a second end of the transmission line, the apparatus comprising:

a first delta filter configured to subtract a pre-fault local current phasor from each of a plurality a local current phasors derived from instantaneous local current values measured by the local current differential relay during a fault in the transmission line to form a plurality of compensated local current phasors, the pre-fault local current phasor latched into a memory of the first delta filter; and a second delta filter configured to subtract a pre-fault remote current phasor from each of a plurality a remote current phasors derived from instantaneous remote current values measured by the remote current differential relay during the fault to form a plurality of compensated second current phasors, the pre- fault remote current phasor latched into a memory of the second delta filter, wherein the at least one line current differential sequence element is configured to receive pairs of corresponding local and remote sequence current phasors of the plurality of compensated local and remote sequence current phasors to compensate the sensitivity of the at least one line current differential element upon conclusion of a timer configured to interrupt operation of the line current differential sequence element upon detecting the single-phase pole-open condition of the transmission line.

23. The apparatus of claim 22, wherein the at least one line current differential sequence element is configured to calculate a plurality of compensated phasor ratios of respective pairs of corresponding local and remote sequence current phasors, and compare each of the plurality of compensated phasor ratios to a stability area of an alpha plane of the at least one line current differential sequence element to provide differential protection for the transmission line.

24. The apparatus of claim 22, wherein the timer comprises a first countdown timer configured to interrupt operation of the at least one line current differential sequence element by a first number of power cycles of the power system upon detecting the single-phase pole-open condition.

25. The apparatus of claim 24, further comprising a second countdown timer associated with a second number of power cycles of the power system, the pre-fault local and remote current contributions latched into respective delta filter memories for the second number of power cycles upon detecting the occurrence of the fault.

26. The apparatus of claim 22, wherein the at least one line current differential element is selected from the group consisting of a zero-sequence current element and a negative-sequence current element.

27. The apparatus of claim 22, wherein the at least one line current differential element is selected from the group consisting of an A-phase current element, a B-phase current element and a C-phase current element.

28. A method for compensating the sensitivity of a line current differential sequence element of a local current differential relay during a single-phase pole-open condition of a transmission line of a power system, the local current differential relay operatively coupled to a first end of the transmission line and in communication with a remote current differential relay operatively coupled to a second end of the transmission line, the method comprising:

subtracting a pre-fault local current phasor from each of a plurality of local current phasors derived from instantaneous local current values measured by the local current differential relay during a fault in the transmission line to form a plurality of compensated local current phasors, the pre-fault local current phasor stored in a first memory location of the local current differential relay; and subtracting a pre-fault remote current phasor from each of a plurality of remote current phasors derived from instantaneous remote current values measured by the remote current differential relay during the fault to form a plurality of compensated second current phasors, the pre-fault remote current phasor stored in a second memory location of the local current differential relay, wherein pairs of corresponding local and remote sequence current phasors of the plurality of compensated local and remote sequence current phasors are provided to the line current differential element to compensate the sensitivity of the line current differential element upon conclusion an interrupt resulting from detection of the single-phase pole-open condition.

29. The method of claim 28, further comprising:

calculating a plurality of compensated phasor ratios of respective pairs of corresponding local and remote sequence current phasors; and comparing each of the plurality of compensated phasor ratios to a stability area of an alpha plane of the line current differential sequence element to provide differential protection of the transmission line.

30. The method of claim 28, further comprising interrupting operation of the line current differential sequence element by a first number of power cycles of the power system upon detecting the single-phase pole-open condition.

31. The method of claim 28, further comprising storing the pre-fault local and remote current phasors into, respective first and second memories for a second number of power cycles of the power system.

32. The method of claim 28, wherein the line current differential sequence element is selected from the group consisting of a zero-sequence current element and a negative-sequence current element.

33. The method of claim 28, wherein the line current differential sequence element is selected from the group consisting of an A-phase current element, a B-phase current element and a C-phase current element.

34. A system for compensating the sensitivity of a first line current differential sequence element of a local current differential relay, the local current differential relay operatively coupled to a first end of the transmission line and in communication with a remote current differential relay operatively coupled to a second end of the transmission line, the system comprising:

a first adder, a first memory register and a first delay filter operatively coupled to the first adder and first memory register, the first delay filter configured to delay a local sequence current phasor calculated prior to detecting a fault in the transmission line, the first memory register configured to store the delayed local sequence current phasor to form a stored local sequence current phasor in response to receipt of a latching signal indicating the fault, the first adder configured to subtract one of the delayed local sequence current phasor and the stored local sequence current phasor from each of a plurality of local sequence current phasors calculated after detecting the fault to form a plurality of compensated local sequence current phasors; and a second adder, a second memory register and a second delay filter operatively coupled to the second adder and the second memory register, the second delay filter configured to delay a remote sequence current phasor calculated prior to detecting the fault, the second memory register configured to store the delayed remote sequence current phasor to form a stored remote sequence current phasor in response to receipt of the latching signal, the second adder configured to subtract one of the delayed remote sequence current phasor and the stored remote sequence current phasor from each of a plurality of remote sequence current phasors calculated after detecting the fault to form a plurality of compensated remote sequence current phasors; and, a circuit for interrupting operation of the first line current differential sequence element upon detecting a single-phase pole-open condition, wherein the first line current differential element is configured to receive pairs of corresponding compensated local and remote sequence current phasors of the plurality of compensated local and remote sequence current phasors to compensate the sensitivity of the first line current differential element.

35. The system of claim 34, wherein the circuit for interrupting comprises a first countdown timer configured to interrupt operation of the first line current differential sequence element by a first countdown time period upon detecting a single-phase pole-open condition of the transmission line to prevent inclusion of unwanted currents in the pairs of corresponding compensated local and remote sequence current phasors provided to the first line current differential element.

36. The system of claim 35, wherein upon expiration of the first countdown timer, the first line current differential sequence element is configured to calculate a plurality of compensated phasor ratios of respective pairs of corresponding compensated local and remote sequence current phasors, and compare the plurality of compensated phasor ratios to a stability area of an alpha plane of the first line current differential sequence element to provide the differential protection.

37. The system of claim 35, further comprising a second line current differential sequence element operable prior to detecting the single-phase pole-open condition, the second line current differential sequence element configured to compare a phasor ratio of each pair of respective local and remote sequence current phasors to a stability area of an alpha plane of the first line current differential sequence element to provide differential protection for the transmission line.

38. The system of claim 35, further comprising:

a first toggle switch operatively coupled to the first adder, the first latched memory register and the first delay filter; and a second toggle switch operatively coupled to the second adder, the second latched memory register and the second delay filter.

39. The system of claim 38, wherein a first position of the first toggle switch enables receipt of the delayed local sequence current phasor by the first adder in response to a toggle control signal indicating no fault in the transmission line, and a second position of the first toggle switch enables receipt of the stored local sequence current phasor by the first adder in response to a toggle control signal indicating the fault in the transmission line, and wherein the first position of the second toggle switch enables receipt of the delayed remote sequence current phasor by the second adder in response to the toggle control signal indicating no fault in the transmission line, and the second position of the second toggle switch enables receipt of the stored remote sequence current phasor by the second adder in response to the toggle control signal indicating no fault in the transmission line.

40. The system of claim 39, further comprising a second countdown timer configured cause the toggle switch to operate in the second position for a second predetermined number of power cycles upon receipt of the latching signal indicating the fault, and cause the toggle switch to operate in the first position upon completion of the second predetermined number of power cycles.

41. The system of claim 40, further comprising a third countdown timer configured to delay operation of the first line current differential sequence element by a third countdown time period upon detecting cessation of a three-phase pole-open condition of the transmission line.

42. The system of claim 34, further comprising an edge-triggered pulse generator configured to generate the latching signal.

43. The system of claim 34, wherein the first line current differential sequence element comprises a zero-sequence current element.

44. The system of claim 34, wherein the first line current differential sequence element comprises a negative-sequence current element.

45. An apparatus for compensating the sensitivity of a line current differential element of a protective relay providing differential protection for a transmission line of a power system, the apparatus comprising:

a delta filter arrangement configured to form compensated first and second current phasors based upon corresponding first and second pre-fault and fault current phasors; and, a circuit for interrupting an operation of the first line current differential element upon detecting a single-phase pole-open condition.

46. The apparatus of claim 45, wherein the delta filter arrangement comprises:

a first delta filter coupled to receive the first pre-fault and fault current phasors and to generate the compensated first current phasor; and a second delta filter coupled to receive the second pre-fault and fault current phasors and to generate the compensated second current phasor.

47. The apparatus of claim 45, wherein the line current differential element is coupled to receive the compensated first and second current phasors thereby compensating the sensitivity of a line current differential element.

48. The apparatus of claim 47, wherein the line current differential element is configured to calculate a compensated phasor ratio using the compensated first and second current phasors, and to compare the compensated phasor ratio to a predefined value range to provide the differential protection.

49. The apparatus of claim 45, wherein each of the first and second pre-fault and fault current phasors is derived from corresponding measured currents at first and second locations of the transmission line.

50. A method for compensating the sensitivity of a line current differential element of a protective relay providing differential protection for a transmission line of a power system, the method comprising:

forming a compensated first signal based on a first pre-fault current and a first fault current measured at a first end of the transmission line;

forming a compensated second signal based on a second pre-fault current and a second fault current measured at a second end of the transmission line; and providing compensated first and second current phasors to the current differential element upon conclusion of an interrupt resulting from detection of a single-phase pole-open condition, thereby compensating the line current differential element, each of the compensated first and second current phasors derived from corresponding compensated first and second signals.

51. The method of claim 50, wherein the forming steps comprise removing the first pre-fault current from the first fault current and removing the second pre-fault current from the second fault current.

52. The method of claim 50, wherein the line current differential element is configured to calculate a compensated phasor ratio using the compensated first and second current phasors, and to compare the compensated phasor ratio to a predefined value range to provide the differential protection.

* * * * *

UNITED STATES PATENT AND TRADEMARK OFFICE
CERTIFICATE OF CORRECTION

PATENT NO. : 7,660,088 B2 Page 1 of 1
APPLICATION NO. : 11/337894
DATED : February 9, 2010
INVENTOR(S) : Mooney et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 963 days.

Signed and Sealed this

Twenty-eighth Day of December, 2010

David J. Kappos
*Director of the United States Patent and Trademark Office*